(12) United States Patent
Sio et al.

(10) Patent No.: US 11,616,054 B2
(45) Date of Patent: Mar. 28, 2023

(54) GATE STRUCTURE FOR SEMICONDUCTOR DEVICES

(71) Applicant: Taiwan Semiconductor Manufacturing Co., Ltd., Hsinchu (TW)

(72) Inventors: Kam-Tou Sio, Zhubei (TW); Sang-Chi Huang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 97 days.

(21) Appl. No.: 16/870,087

(22) Filed: May 8, 2020

(65) Prior Publication Data

US 2021/0351174 A1    Nov. 11, 2021

(51) Int. Cl.
| | |
|---|---|
| *H01L 21/8238* | (2006.01) |
| *H01L 27/092* | (2006.01) |
| *H01L 27/02* | (2006.01) |
| *G06F 30/392* | (2020.01) |
| *G06F 30/398* | (2020.01) |
| *G06F 30/31* | (2020.01) |
| *H01L 23/522* | (2006.01) |
| *H01L 29/423* | (2006.01) |
| *G06F 119/18* | (2020.01) |

(52) U.S. Cl.
CPC .......... *H01L 27/0207* (2013.01); *G06F 30/31* (2020.01); *G06F 30/392* (2020.01); *G06F 30/398* (2020.01); *H01L 21/82385* (2013.01); *H01L 21/823871* (2013.01); *H01L 23/5228* (2013.01); *H01L 27/0922* (2013.01); *H01L 29/42376* (2013.01); *G06F 2119/18* (2020.01)

(58) Field of Classification Search
CPC ....... H01L 21/823828; H01L 21/82385; H01L 21/823871; H01L 27/092; H01L 27/0922
See application file for complete search history.

(56) References Cited

U.S. PATENT DOCUMENTS

| | | | |
|---|---|---|---|
| 6,252,427 B1 | 6/2001 | Domae et al. | |
| 10,867,113 B2 | 12/2020 | Chien et al. | |
| 2004/0169207 A1* | 9/2004 | Park | ................ H01L 21/823481 |
| | | | 257/E21.627 |

(Continued)

FOREIGN PATENT DOCUMENTS

| | | |
|---|---|---|
| DE | 10 2018 117 704 A1 | 3/2019 |
| KR | 2018/0061031 A | 6/2018 |

(Continued)

*Primary Examiner* — Bryan R Junge
(74) *Attorney, Agent, or Firm* — Sterne, Kessler, Goldstein & Fox P.L.L.C.

(57) ABSTRACT

A semiconductor structure is disclosed, including a first gate and a second gate aligned with the first gate, a first gate via, a second gate via, multiple conductive segments, and a first conductive line. The first gate via is disposed on the first gate and the second gate via is disposed on the second gate. The first and second gates are configured to be a terminal of a first logic circuit, which is coupled to a terminal of a second logic circuit. The first conductive line is coupled to the first gate through a first connection via and the first gate via and is electrically coupled to the second gate through a second connection via and the second gate via.

18 Claims, 22 Drawing Sheets

(56) References Cited

U.S. PATENT DOCUMENTS

| | | | | |
|---|---|---|---|---|
| 2005/0017362 | A1* | 1/2005 | Erickson | H01L 29/4238 257/758 |
| 2005/0195636 | A1* | 9/2005 | Umezawa | H01L 27/11531 365/149 |
| 2012/0008361 | A1* | 1/2012 | Lee | G11C 16/3418 365/63 |
| 2013/0154011 | A1* | 6/2013 | Jou | H01L 29/785 257/E27.06 |
| 2015/0311199 | A1* | 10/2015 | Bouche | H01L 29/66795 257/401 |
| 2016/0300839 | A1* | 10/2016 | Kim | H01L 27/0207 |
| 2017/0104075 | A1* | 4/2017 | Nagy | H03F 1/56 |
| 2018/0150589 | A1* | 5/2018 | Yang | G06F 30/394 |
| 2019/0131171 | A1* | 5/2019 | Gwak | H01L 29/41775 |
| 2021/0035902 | A1* | 2/2021 | Kang | H01L 27/0924 |

FOREIGN PATENT DOCUMENTS

| | | | | |
|---|---|---|---|---|
| KR | 20200028869 A | | 3/2020 | |
| WO | WO-2017217984 A1 | * | 12/2017 | H01L 29/93 |

\* cited by examiner

100

100

| case | A | B | C | D | E |
|---|---|---|---|---|---|
| layout view | | | | | |
| gate resistance | 1x | 0.75x | 0.79x | 0.52x | 0.54x |

FIG. 13

GATE STRUCTURE FOR SEMICONDUCTOR DEVICES

BACKGROUND

Integrated circuits have been widely used for various kinds of applications, and the demand for faster processing speed and lower power consumption is increasing. However, gate resistance highly influences the performance of the integrated circuit. Thus, optimization of the integrated circuit layout design including various layers of features, such as conductive structures of vias coupled to the gate structures and other metal routing, is needed.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 13 illustrates a comparison table of a gate resistance, in accordance with some embodiments of the present disclosure.

DETAILED DESCRIPTION

Figure 1A:
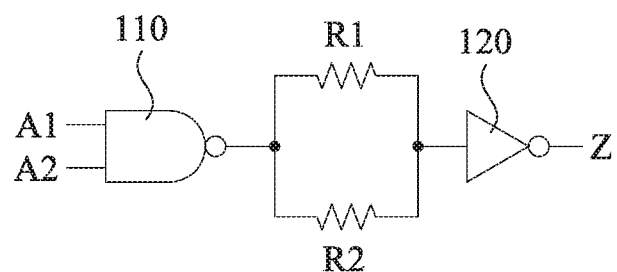
FIG. 1A is an equivalent circuit of part of an integrated circuit, in accordance with various embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Reference is now made to FIG. 1A. FIG. 1A is an equivalent circuit of part of an integrated circuit 100, in accordance with various embodiments. For illustration, the integrated circuit includes logic gates 110-120. A first terminal and second terminals of the logic gate 110 are coupled to signals A1-A2 respectively. A third terminal of the logic gate 110 is coupled to a first terminal of the logic gate 120 through resistors R1-R2. The resistors R1-R2 are coupled in parallel. A second terminal of the logic gate 120 is as an output terminal Z. In some embodiments, the logic gate 110 is a NAND gate and the logic gate 120 is an inverter. In various embodiments, the logic gate 110 is referred as a first stage circuit, and the logic gate 120 is referred as a second stage circuit. The configurations of the integrated circuit 100 are given for illustrative purposes. Various implements of the integrated circuit 100 are within the contemplated scope of the present disclosure. For example, in some embodiments, the integrated circuit 100 is a logic gate circuit including AND, OR, NAND, MUX, Flip-flop, Latch, BUFF or any other types of logic circuit.

In some embodiments, the resistor R1 represents a resistance contributed by part of the routing arranged to couple the first terminal of the logic gate 110 with the logic gate 120. Similarly, the resistor R2 represents a resistance contributed by another part of the routing arranged to couple the first terminal of the logic gate 110 with the logic gate 120. The details of the configuration of the resistors R1 and R2 will be discussed in the following paragraphs.

Figure 1B:
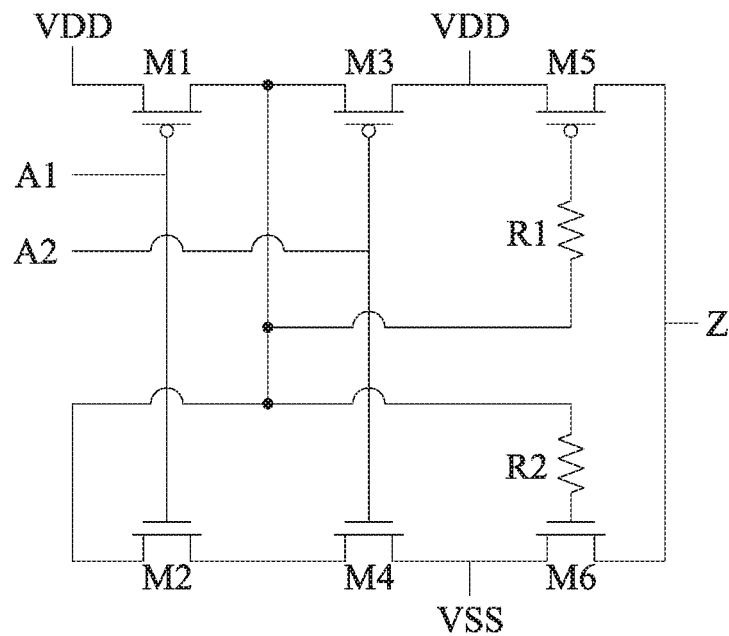
FIG. 1B is a detailed circuit corresponding to the equivalent circuit of part of the integrated circuit in FIG. 1A, in accordance with various embodiments.

Reference is now made to FIG. 1B. FIG. 1B is a detailed circuit corresponding to the equivalent circuit of part of the integrated circuit 100 in FIG. 1A, in accordance with various embodiments. For illustration, the integrated circuit 100 includes transistors M1-M6 coupled between supply voltages VDD and VSS. With respect to the logic gates 110-120 of FIG. 1A, in some embodiments, the logic gate 110 includes the transistors M1-M4. The logic gate 120 includes the transistors M5-M6.

In some embodiments, the transistors M1, M3, and M5 are P-type transistors, and the transistors M2, M4, and M6 are N-type transistors. The configurations of the transistors M1-M6 are given for illustrative purposes. Various implements of FIG. 1A are within the contemplated scope of the present disclosure. For example, in some embodiments, the transistors M1, M3, and M5 are N-type transistors, and the transistors M2, M4, and M6 are P-type transistors.

With reference to FIG. 1B, gates of the transistors M1-M2 are coupled with each other and are configured to be, for example, as the first terminal of the logic gate 110 to be coupled to the signal A1. Gates of the transistors M3-M4 are coupled with each other and are configured to be, for example, the second terminal of the logic gate 110 to be coupled to the signal A2. Gates of the transistors M5-M6 are coupled to each other, drain terminals of the transistors M1 and M3, and a source/drain terminal of the transistor M2 through the resistors R1-R2. The gates of the transistors M5-M6 are configured to be the first terminal of the logic gate 120. Source terminals of the transistor M1, M3, and M5 are coupled to the supply voltage VDD. A drain/source terminal of the transistor M2 is coupled to a drain terminal of the transistor M4. Source terminals of the transistors M4 and M6 are coupled to the supply voltage VSS. Drain terminals of the transistor M5 and M6 are coupled to each other and are configured to be the second terminal of the logic gate 120.

Figure 2A:
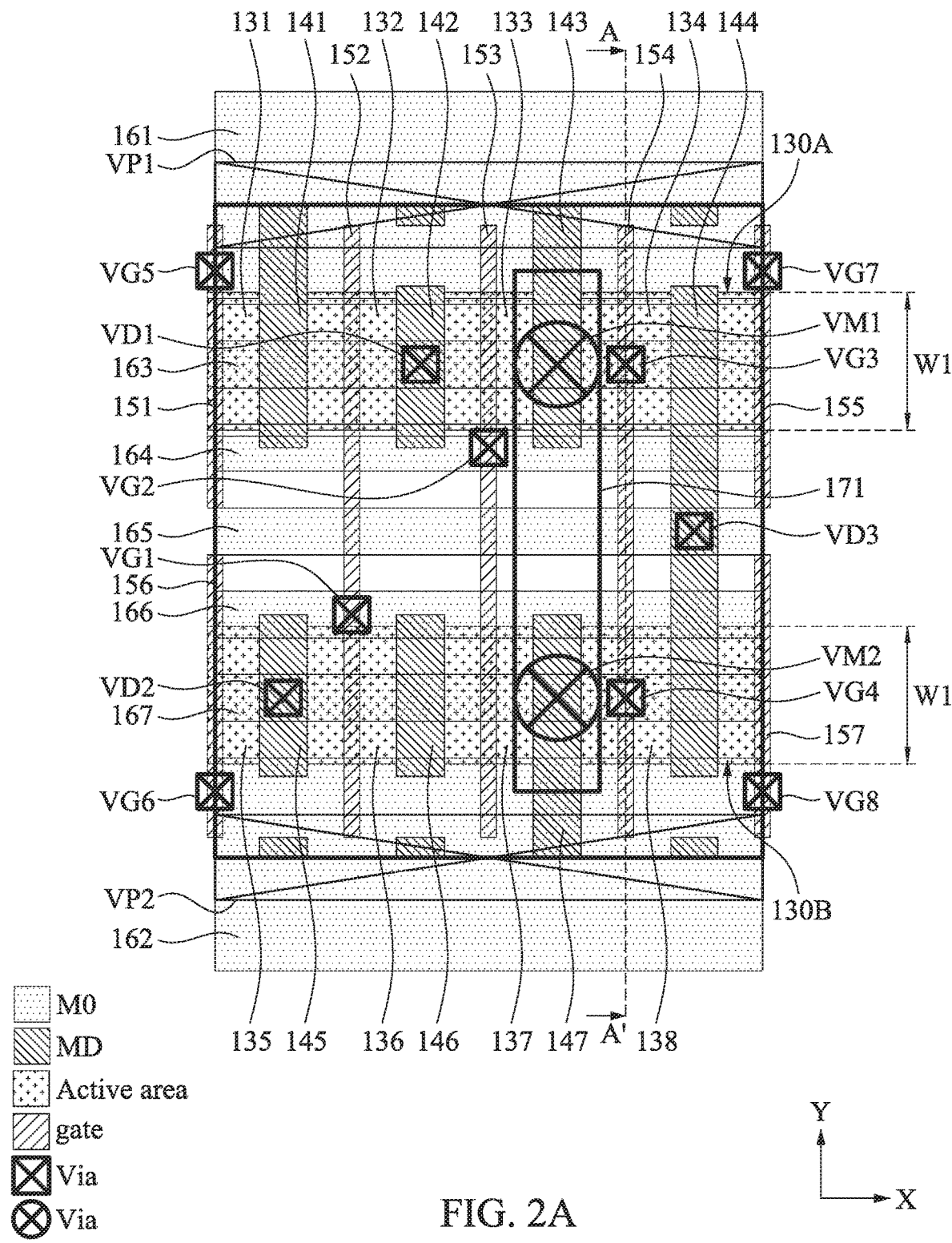
FIG. 2A is a layout diagram in a plan view of part of the integrated circuit corresponding to a part of FIG. 1B, in accordance with various embodiments.

Reference is now made to FIG. 2A. FIG. 2A is a layout diagram in a plan view of part of the integrated circuit 100 corresponding to a part of FIG. 1B, in accordance with various embodiments. For illustration, the integrated circuit 100 includes active areas 130A-130B, conductive patterns (metal-to-device, MD) 141-147, gates 151-157, conductive segments (metal-zero segments, M0) 161-167, conductive line 171 (metal-one segments, M1), vias VD1-VD3, VG1-VG8, VM1-VM2, and VP1-VP2. In some embodiments, the active areas 130A-130B are disposed in a first layer and the gates 151-157 cross the active areas 130A-130B. The conductive patterns 141-147 are disposed in a second layer above the first layer. The conductive line 171 is disposed in a third layer above the second layer. The vias VD1-VD3, VG1-VG8, and VP1-VP2 are arranged between the first layer and the second layer. The vias VM1-VM2 are arranged between the second layer and the third layer.

With reference to FIGS. 1B and 2A, the active areas 130A-130B are configured for the formation of the transistors M1-M6. The conductive pattern 141 corresponds to the source terminal of the transistor M1. The conductive pattern 142 corresponds to the drain terminals of the transistors M1 and M3. The conductive pattern 143 corresponds to the source terminals of the transistors M3 and M5. The conductive pattern 144 corresponds to the drain terminals of the transistors M5-M6. The conductive pattern 145 corresponds to the source/drain terminal of the transistor M2. The conductive pattern 146 corresponds to the drain/source terminal of the transistor M2 and the drain terminal of the transistor M4. The conductive segment 167 corresponds to the source terminals of the transistors M4 and M6.

The gate 152 corresponds to the gates of the transistors M1-M2. The gate 153 corresponds to the gates of the transistors M3-M4. The gate 154 corresponds to the gates of the transistors M5-M6. Alternatively stated, the gate 152 is shared by the transistors M1-M2. The gate 153 is shared by the transistors M3-M4. The gate 154 is shared by the transistors M5-M6. The gates 151, and 155-157 are referred to as dummy gates, in which in some embodiments, the "dummy" gate is referred to as being not electrically connected as the gate for MOS devices, having no function in the circuit.

As shown in FIG. 2A, for illustration, the active areas 130A-130B extend in x direction and are separate from each other in y direction different from x direction. The active areas 130A-130B have widths W1 in y direction. In some embodiments, the active area 130A includes active regions 131-134, and the active area 130B includes active regions 135-138.

In some embodiments, the active areas 130A-130B are disposed on a substrate (not shown). The substrate includes materials including, for example, silicon and/or is doped with phosphorus, arsenic, germanium, gallium, Indium arsenide or a combination thereof. In various embodiments, the active area 130A is doped with p-type dopants including, such as boron, indium, aluminum, gallium, or a combination thereof, and the active area 130B is doped with n-type dopants, including, such as phosphorus, arsenic, or a combination thereof.

The configurations of the active areas 130A-130B are given for illustrative purposes. Various implements of the active areas 130A-130B are within the contemplated scope of the present disclosure. For example, in some embodiments, the active areas 130A-130B include more area regions which are separate from each other along x direction and are corresponding to terminals of the transistors M1-M6 separately.

For illustration, the conductive patterns 141-147 extend in y direction. The conductive patterns 141-143, and 145-147 are disposed on and coupled to the active regions 131-133, and 135-137 separately. The conductive pattern 144 is disposed on and coupled to the active regions 134 and 138.

The gates 151-157 extend in y direction. The gates 151 and 156 are separate from each other in y direction, and the gates 155 and 157 are separate from each other in y direction. In some embodiments, the gates are made separated by a cut layer (not shown). As shown in FIG. 2A, the gates 151 and 155 cross the active area 130A. The gates 156 and 157 cross active area 130B. The gates 152-154 cross both the active areas 130A-130B.

The conductive segments 161-167 extend in x direction and are separate from each other in y direction. The conductive segments 161 and 163-164 overlap the active area 130A. The conductive segments 162 and 166-167 overlap the active area 130B.

The configurations of the conductive segments 161-167 are given for illustrative purposes. Various implements of the conductive segments 161-167 are within the contemplated scope of the present disclosure. For example, in some embodiments, the conductive segments 161-162 do not overlap the active areas 130A-130B. In various embodiments, the active areas 130A-130B have larger widths than the width W1, and accordingly, the conductive segments 164-166 fully overlap the active areas 130A-130B. In various embodiments, there are more conductive segments, than those are shown in FIG. 2A, for the routing of the integrated circuit 100.

The conductive line 171 extends in y direction and overlaps the active areas 130A-130B, and the conductive segments 161-167. In some embodiments, the conductive line 171 is interposed between the gates 153-154. The configurations of the conductive line 171 are given for illustrative purposes. Various implements of the conductive line 171 are within the contemplated scope of the present disclosure. For example, in some embodiments, the conductive line 171 is arranged between the gates 154-155, and 157.

For illustration, the via VP1 is coupled between the conductive segment 161 and the conductive patterns 141 and 143. In some embodiments, the conductive segment 161 outputs the supply voltage VDD to the conductive patterns 141 of the transistor M1 and the conductive pattern 143 of the transistors M3 and M5 of FIG. 1B through the via VP1. The via VP2 is coupled between the conductive segment 162 and the conductive pattern 147. In some embodiments, the conductive segment 162 receives the supply voltage VSS for the conductive pattern 147 of the transistors M4 and M6 of FIG. 1B through the via VP2.

The via VD1 is coupled between the conductive segment 161 and the conductive pattern 142. The via VD2 is coupled between the conductive segment 167 and the conductive pattern 145. The via VD3 is coupled between the conductive segment 165 and the conductive pattern 144. In some embodiments, the conductive segment 165 outputs a signal processed by the integrated circuit 100 to the output terminal Z through the via VD3.

The via VG1 is coupled between the conductive segment 166 and the gate 152. The conductive segment 166 outputs the signal A1 to the gates of the transistors M1-M2 of FIG. 1B. The via VG2 is coupled between the conductive segment 164 and the gate 153. In some embodiments, the conductive segment 164 outputs the signal A2 to the gates of the transistors M3-M4 of FIG. 1B. The vias VG3-VG4 are disposed on and coupled to the gate 154. As shown in FIG. 2A, the via VG3 couples the gate 154 to the conductive pattern 142 through the conductive segment 163 and the via VD1. The via VG4 couples the gate 154 to the conductive pattern 145 through the conductive segment 167 and the via VD2. In addition, the vias VG5-VG8 are disposed on and coupled to the gates 151, 156, 155, and 158 separately. In some embodiments, the gates VG5 and VG7 are coupled to the conductive segment 161, and the gates VG6 and VG8 are coupled to the conductive segment 162.

The via VM1 is disposed on and coupled to the conductive segment 163, and the via VM2 is disposed on and coupled to the conductive segment 167. The vias VM1-VM2 are further coupled to the conductive line 171. Accordingly, the conductive segment 163 is coupled to the conductive segment 167 through the via VM1, the conductive line 171, and the via VM2. The configurations of the vias VM1-VM2 are given for illustrative purposes. Various implements of the vias VM1-VM2 are within the contemplated scope of the present disclosure. For example, in some embodiments, the vias VM1-VM2 have tapered shapes which include a larger area contacting the conductive line 171, compared with an area contacting the conductive segments 163 and 167.

With reference to FIGS. 1B and 2A, as discussed above, the gate 154 corresponds to the gates of the transistors M5-M6, while the conductive line 171 is further coupled to the gate 154. In such embodiments, the gate 154, the vias VG3-VG4, the conductive segments 163 and 167, the vias VM1-VM2, and the conductive line 171 are included in the routing structure which contributes to the resistance of the resistor R1 or R2 of FIG. 1B. Accordingly, when the resistance generated by the routing structure is reduced, the equivalent resistance of the resistor R1 or R2 is reduced correspondingly.

Continuing with the aforementioned discussions, in some approaches, transistors, corresponding to the transistors M5-M6, share a gate corresponding to the gate 154, in which the gate is not coupled to an extra metal line corresponding to, for example, the conductive line 171. In such approaches, a signal transmitted in the gate 154 experiences high resistance contributed by the gate 154. Compared with the approaches, with the configurations of FIG. 2A, a signal transmitted in the gate 154 is also transmitted through the conductive line 171. Alternatively stated, two paths coupled in parallel for transmitting the signal are provided, and accordingly the resistance generated by the routing structure between the gates of the transistors M5-M6 of FIG. 1B is reduced. In some embodiments, with the configurations of the FIG. 2A, the resistance is about half of that of some approaches.

In addition, in some embodiments, a ratio of a width, in x direction, of the conductive line 171 over a width of the gate 154 ranges from about 1 to about 20. In various embodiments, a ratio of a height, in z direction different from x and y directions, of the conductive line 171 over a height of the gate 154 ranges from about 1 to about 40 times. Accordingly, in such embodiments, the conductive line 171 provides a greater cross-sectional area and a correspondingly much lower resistance, compared with the gate 154.

Hence, the resistance generated by the routing structure between the gates of the transistors M5-M6 of FIG. 1B is further reduced.

Furthermore, in some embodiments, the resistance generated by the routing structure between the gates of the transistors M5-M6 of FIG. 1B is further associated with the locations of the vias VG3-VG4, relative to the active areas 130A and 130B. For example, as the embodiments shown in FIG. 2A, the conductive segments 163 and the via VG3 align with a center of a width of the active area 130A in y direction, and the conductive segments 167 and the via VG4 align with a center of a width of the active area 130B in y direction. In such embodiments, for example, the signal transmitted through the conductive segment 163 and the via VG3 passes directly into the gate 154 and the active area 130A without propagating a long distance in the gate 154. Alternatively stated, the signal experiences less resistance, compared with some approaches, in which the via, corresponding to the via VG3, is arranged away from the center of the active area 130A, and accordingly the signal propagates in the gate 154 a distance before entering into the active area. The arrangements of the conductive segment 167 and the via VG4 are similar to that of the conductive segments 163 and the via VG3. Therefore, the repetitious descriptions are omitted here for brevity.

With the configurations of FIG. 2A, in some embodiments, the integrated circuit 100 obtains about 10% faster in speed compared with some approaches. In various embodiments, as the transistors M5-M6 are implemented multiple corresponding transistors, the integrated circuit 100 obtains about 5% faster in speed compared with some approaches.

The configurations of FIG. 2A are given for illustration purposes. Various implements of FIG. 2A are within the contemplated scope of the present disclosure. For example, in some embodiments, widths of the conductive segments 163 and 167 are greater than that of the conductive line 171.

Figure 2B:
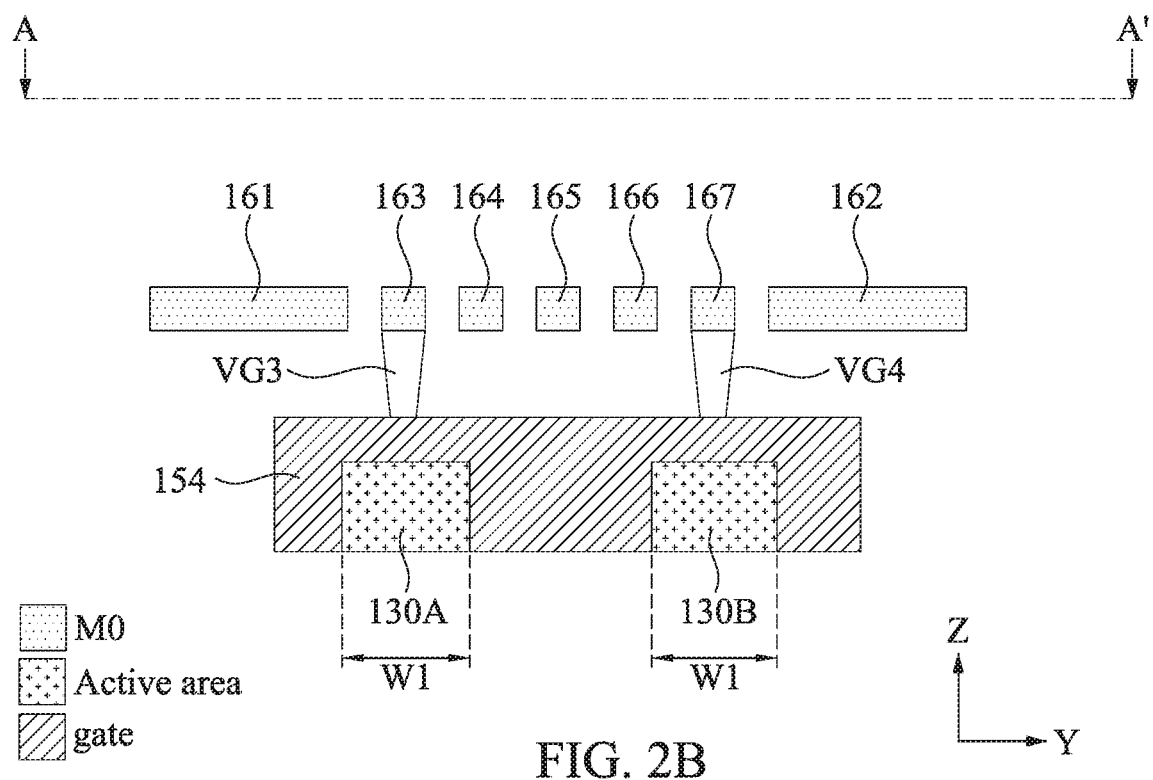
FIG. 2B is a cross-sectional view of part of the integrated circuit in FIG. 2A, in accordance with various embodiments.

Reference is now made to FIG. 2B. FIG. 2B is a cross-sectional view of part of the integrated circuit 100 in FIG. 2A along line AA in FIG. 2A, in accordance with various embodiments. For illustration, the gate 154 disposes over the active areas 130A-130B, and a part of the gate 154 abuts both the active areas 130A-130B. The vias VG3-VG4 align the centers, in y direction, of the active areas 130A-130B, and are separate from each other in y direction.

In some embodiments, the vias VG3-VG4 have tapered shapes which include a larger area contacting the conductive segment 163 or 167, compared with an area contacting the gate 154. The configurations of FIG. 2B are given for illustration purposes. Various implements of FIG. 2B are within the contemplated scope of the present disclosure. For example, in some embodiments, the vias VG3-VG4 include uniform shape along z direction. In alternative embodiments, the vias VG3-VG4 include a smaller area contacting the conductive segment 163 or 167, compared with the area contacting the gate 154.

Figure 3:
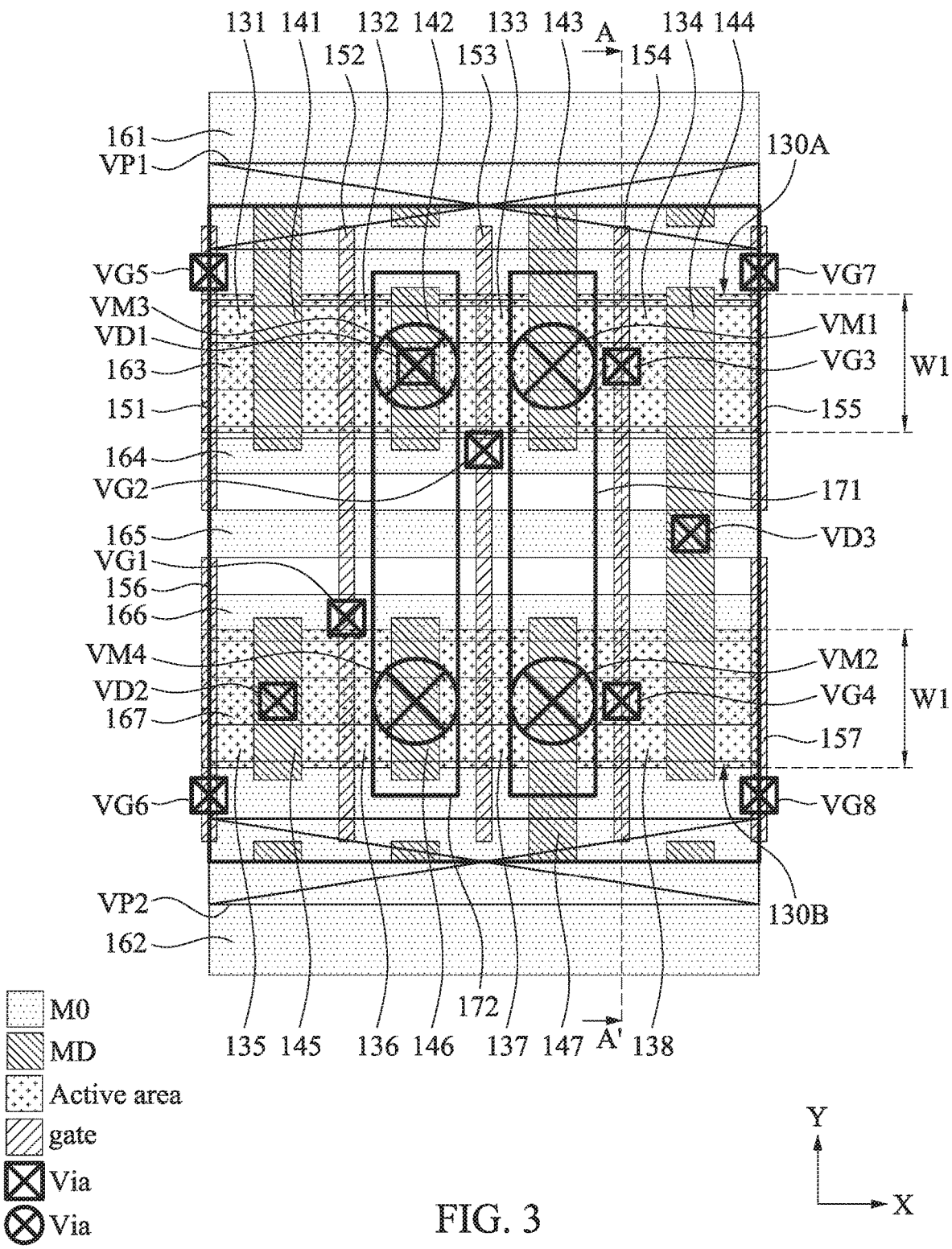
FIG. 3 is another layout diagram in the plan view of part of the integrated circuit corresponding to a part of FIG. 1B, in accordance with various embodiments.

Reference is now made to FIG. 3. FIG. 3 is another layout diagram in the plan view of part of the integrated circuit 100 corresponding to a part of FIG. 1B, in accordance with various embodiments. With respect to the embodiments of FIG. 3, like elements in FIG. 2A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 3.

Compared with FIG. 2A, the integrated circuit 100 further includes a conductive line 172 and vias VM3-VM4. The conductive line 171 is configured with respect to, for example, the conductive line 171. The vias VM3-VM4 are configured with respect to, for example, the vias VM1-VM2. The conductive line 172 is disposed between the gates 152-153 and crosses the active areas 130A-130B. Specifically, the via VM3 is disposed on and coupled to the conductive segment 163, and the via VM4 is disposed on and coupled to the conductive segment 167. The vias VM3-VM4 are coupled to the conductive line 172. Alternatively stated, the gate 154 is further coupled to the conductive line 172.

With reference to FIGS. 1B, 2A, and 3, in such embodiments of FIG. 3, the conductive line 172 is also included in the routing structure which contributes to the resistance of the resistor R1 or R2 of FIG. 1B. Because the extra path for transmitting the signal in the gate 154 is provided by the vias VM3-VM4 and the conductive line 172, and accordingly the resistance generated by the routing structure between the gates of the transistors M5-M6 of FIG. 1B is reduced.

The configurations of FIG. 3 are given for illustration purposes. Various implements of FIG. 3 are within the contemplated scope of the present disclosure. For example, in some embodiments, the conductive line 172 is disposed between the gates 151, 156, and 152. In various embodiments, the conductive line 172 includes at least two conductive lines that one of two is disposed between the gates 151, 156, and 152, and the other is disposed between the gates 154, 155, and 157. In various embodiments, the gate 154 of FIG. 3 is divided into two portions as gates 154a-154b later illustrated in FIG. 6A.

Figure 4A:
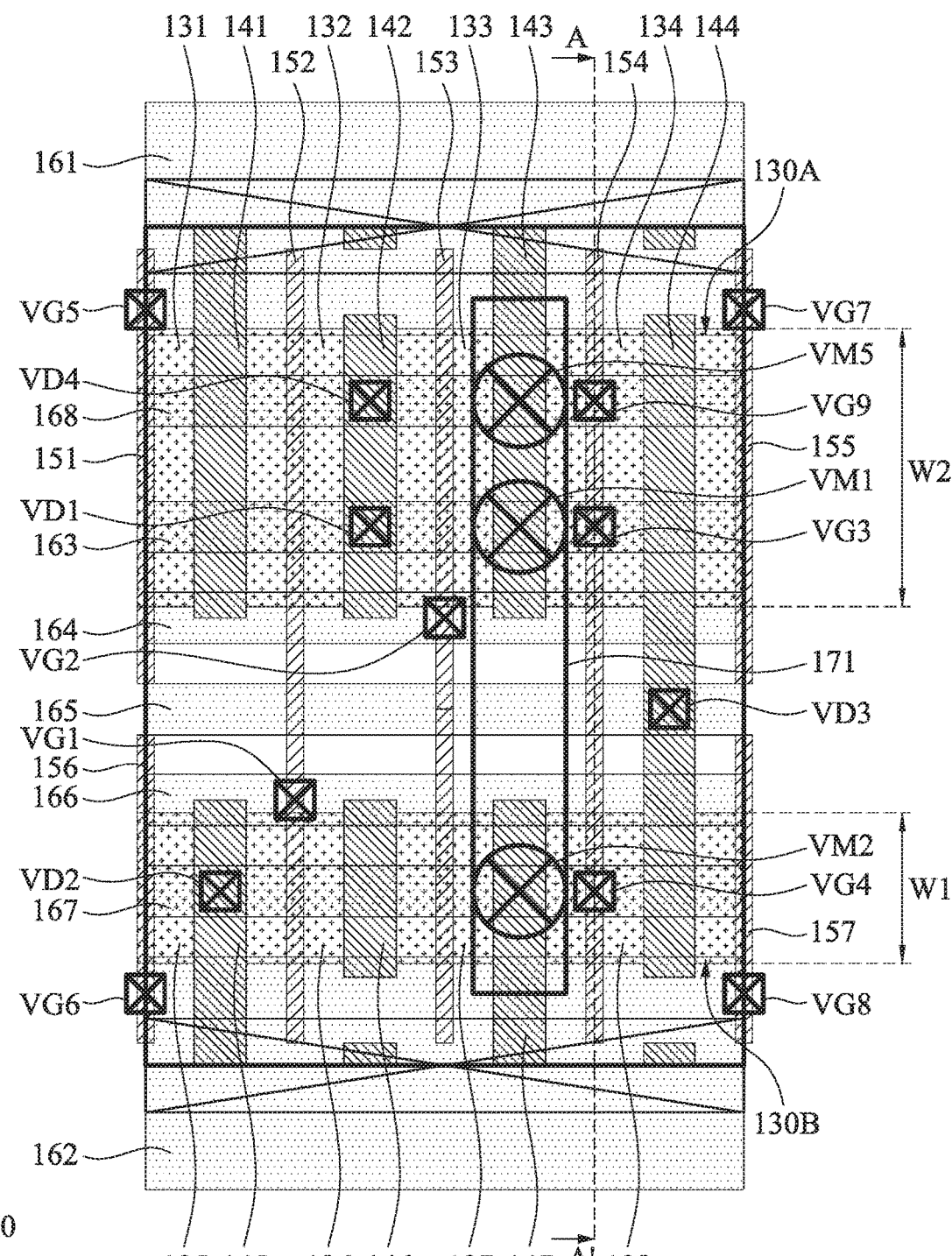
FIG. 4A is another layout diagram in the plan view of part of the integrated circuit corresponding to a part of FIG. 1B, in accordance with various embodiments.

Reference is now made to FIG. 4A. FIG. 4A is another layout diagram in the plan view of part of the integrated circuit 100 corresponding to a part of FIG. 1B, in accordance with various embodiments. With respect to the embodiments of FIG. 4A, like elements in FIG. 2A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4A.

Compared with FIG. 2A, the integrated circuit 100 further includes vias VD4, VM5, and VG9, a conductive segment 168. The vias VD4, VM5, and VG9 are configured with respect to the vias VD1, VM1, and VG3, separately. The conductive segment 168 is configured with respect to, for example, the conductive segment 163. For illustration, the via VD4 is disposed on and coupled to the conductive pattern 142. The via VG9 is disposed on and coupled to the gate 154. The via VM5 is disposed on and coupled to the conductive segment 168. The conductive segment 168 is coupled to the conductive line 171 through the via VM5.

With reference to FIGS. 1B, 2A, and 4A, in such embodiments of FIG. 4A, the vias VD4, VM5, and VG9, the conductive segment 168 are also included in the routing structure which contributes to the resistance of the resistor R1 or R2 of FIG. 1B. Because the extra path for transmitting the signal in the gate 154 is provided by the vias VD4, VM5, and VG9, the conductive segment 168, and accordingly the resistance generated by the routing structure between the gates of the transistors M5-M6 of FIG. 1B is reduced.

In addition, as the embodiments shown in FIG. 4A, a number of the vias, configured with respect to the via VG3, is associated with the width of the active area 130A, and a number of the vias, configured with respect to the via VG4, is associated with the width of the active area 130B. Specifically, compared with FIG. 2A, the active area 130A has a width W2 different from the width Wi. In some embodiments, the width W2 is greater than the width W1. Accordingly, in such embodiments, the number of the vias disposed on the portion of the gate 154 crossing the active area 130A is greater than the number of the vias disposed on the portion of the gate 154 crossing the active area 130B. Alternatively stated, the width of the active area 130 increases from the width W1 to the width W2, the number of the vias disposed on the portion of the gate 154 crossing the active area 130A increases correspondingly.

As discussed above, in some embodiments, a length of the gate 154 of FIG. 4A is longer than that of the gate 154 of FIGS. 2A and 3. Alternatively stated, the number of the vias configured with respect to the via VG3 and the number of the vias configured with respect to the via VG4 are also associated with the length of the gate 154.

Moreover, in some embodiments, the conductive segments 163 and 168 merge with each other and are configured to be a conductive segment having a width greater than the width of individual conductive segment 163 or 168. In such arrangements, the resistance generated by the routing structure between the gates of the transistors M5-M6 of FIG. 1B is further reduced due to greater conductive area of the conductive segment.

The configurations of FIG. 4A are given for illustration purposes. Various implements of FIG. 4A are within the contemplated scope of the present disclosure. For example, in some embodiments, the conductive line 172 in the embodiments of FIG. 3 is further included in the embodiments of FIG. 4A. The conductive line 172 is coupled with the conductive segments 163, 167, and 168 through VM3-VM4 and an extra via configured with respect to the via VM3. In various embodiments, the number of the vias configured with respect to the vias VG3 and VG9 is more than two. Accordingly, the number of the conductive segments configured with respect to the conductive segments 163 and 168 is more than two. In various embodiments, the gate 154 of FIG. 4A is divided into two portions as gates 154a-154b later illustrated in FIG. 6A.

Figure 4B:
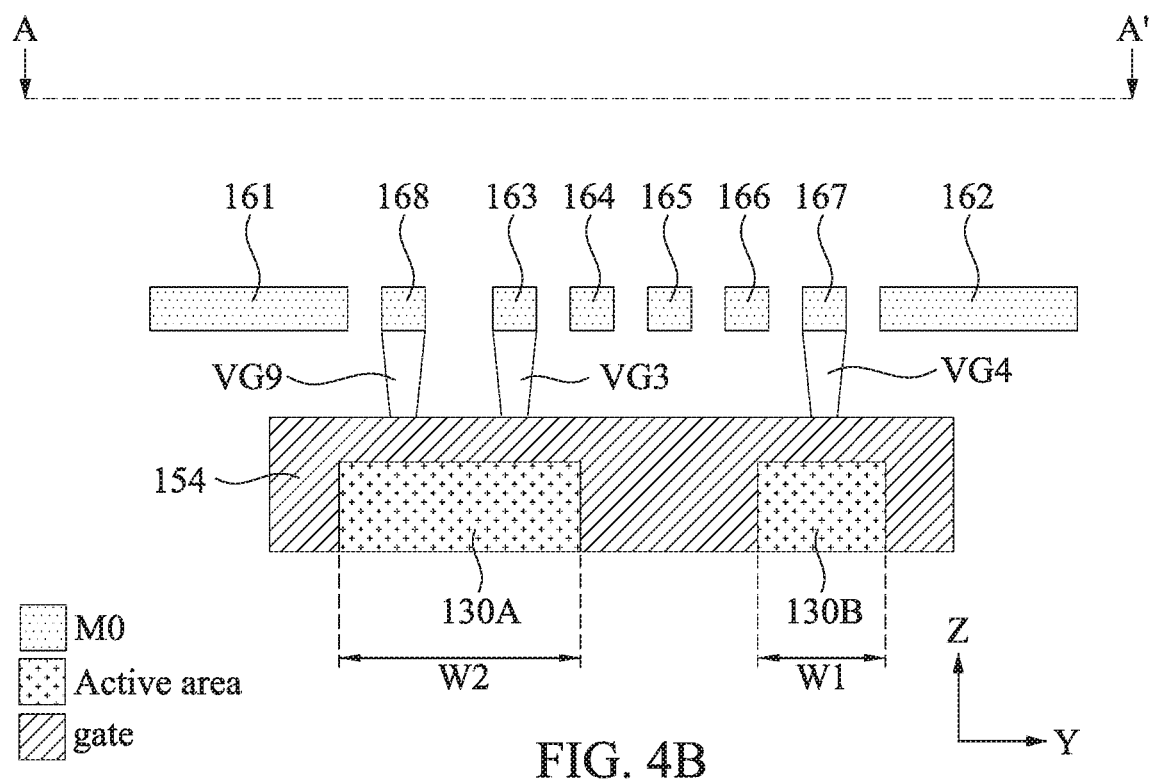
FIG. 4B is a cross-sectional view of part of the integrated circuit in FIG. 4A, in accordance with various embodiments.

Reference is now made to FIG. 4B. FIG. 4B is a cross-sectional view of part of the integrated circuit 100 in FIG. 4A, in accordance with various embodiments. With respect to the embodiments of FIG. 4B, like elements in FIG. 2B are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 4B.

Compared with FIG. 2B, the integrated circuit 100 further includes the via VG9 and the conductive segment 168. The VG9 is disposed away from the via VG3 by a distance. The configurations of FIG. 4B are given for illustration purposes. Various implements of FIG. 4B are within the contemplated scope of the present disclosure. For example, in some embodiments, the via VG9 aligns the centers, in y direction, of the active area 130A having the width W2.

Figure 5A:
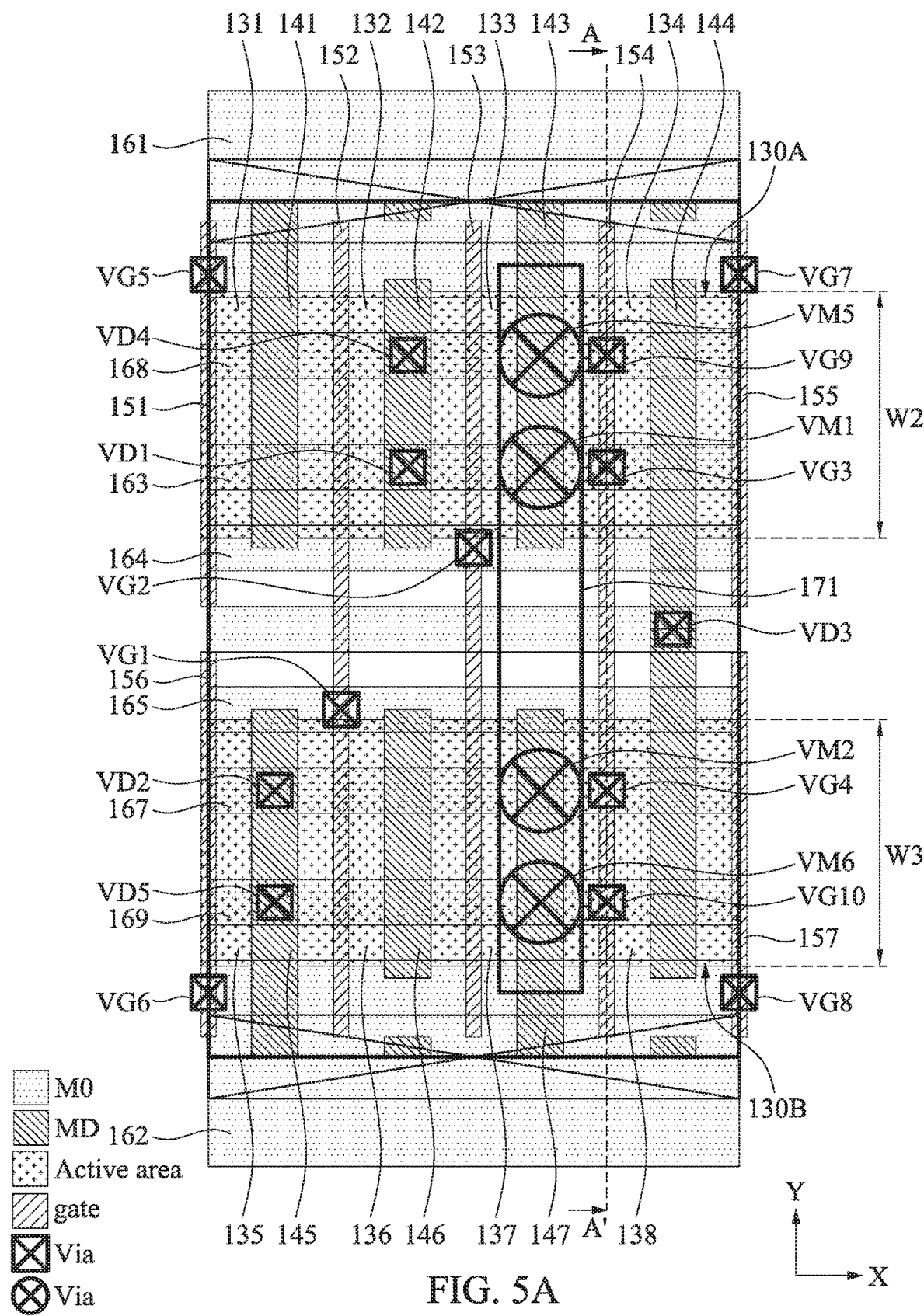
FIG. 5A is another layout diagram in the plan view of part of the integrated circuit corresponding to a part of FIG. 1B, in accordance with various embodiments.

Reference is now made to FIG. 5A. FIG. 5A is another layout diagram in the plan view of part of the integrated circuit 100 corresponding to a part of FIG. 1B, in accordance with various embodiments. With respect to the embodiments of FIG. 5A, like elements in FIG. 4A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 5A.

Compared with FIG. 4A, the integrated circuit 100 further includes vias VM6 and VG10, a conductive segment 169. The vias VM6 and VG10 are configured with respect to the vias VM2, and VG4, separately. The conductive segment 169 is configured with respect to, for example, the conductive segment 167. For illustration, The via VG10 is disposed on and coupled to the gate 154. The via VM6 is disposed on and coupled to the conductive segment 169. The conductive segment 169 is coupled to the conductive line 171 through the via VM6.

With reference to FIGS. 1B, 4A, and 5A, in such embodiments of FIG. 5A, the vias VM6 and VG10, the conductive segment 169 are also included in the routing structure which contributes to the resistance of the resistor R1 or R2 of FIG. 1B. Because the extra path for transmitting the signal in the gate 154 is provided by the vias VM6 and VG10, the conductive segment 169, and accordingly the resistance generated by the routing structure between the gates of the transistors M5-M6 of FIG. 1B is reduced.

In addition, as the embodiments shown in FIG. 5A, the active area 130B has a width W3. In some embodiments, the width W3 is the same as the width W2. In various embodiments, the width W3 is different from the width W2. Accordingly, in such arrangements, the number of the vias disposed on the portion of the gate 154 crossing the active area 130A is different from the number of the vias disposed on the portion of the gate 154 crossing the active area 130B. The relationship between the vias disposed on the portion of the gate 154 crossing the active area 130B and the width of the active area 130B is similar the relationship between the vias disposed on the portion of the gate 154 crossing the active area 130A and the width of the active area 130A. Therefore, the repetitious descriptions are omitted here for brevity.

Figure 5B:
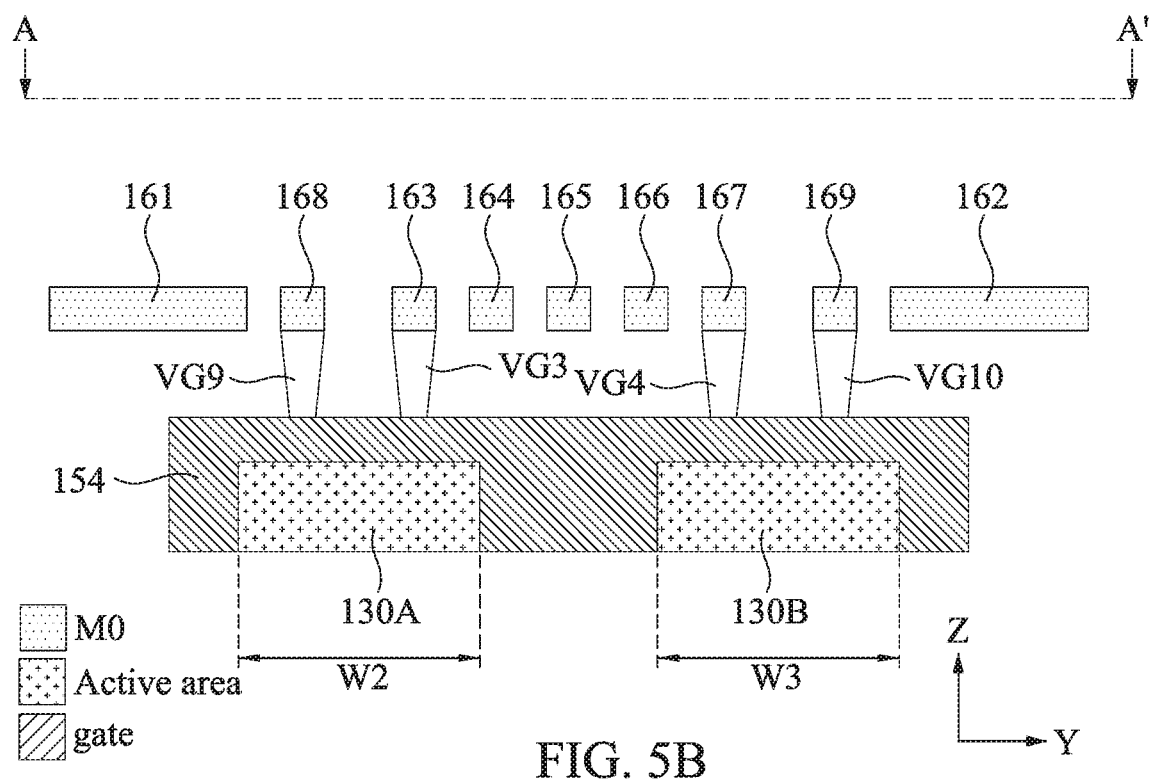
FIG. 5B is a cross-sectional view of part of the integrated circuit in FIG. 5A, in accordance with various embodiments.

Reference is now made to FIG. 5B. FIG. 5B is a cross-sectional view of part of the integrated circuit 100 in FIG. 5A, in accordance with various embodiments. With respect to the embodiments of FIG. 5B, like elements in FIG. 4B are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 5B.

Compared with FIG. 4B, the integrated circuit 100 further includes the via VG10 and the conductive segment 169. The VG10 is disposed away from the via VG4 by a distance. The configurations of FIG. 5B are given for illustration purposes. Various implements of FIG. 5B are within the contemplated scope of the present disclosure. For example, in some embodiments, the via VG10 aligns the centers, in y direction, of the active area 130B having the width W3.

The configurations of FIGS. 5A-5B are given for illustration purposes. Various implements of FIGS. 5A-5B are within the contemplated scope of the present disclosure. For example, in some embodiments, by changing the width of the active area 130B, for example, reducing the width W3, the via VG4 does not overlap the active area 130B in the layout view. In various embodiments, the gate 154 of FIG. 5A is divided into two portions as gates 154a-154b later illustrated in FIG. 6A.

Figure 6A:
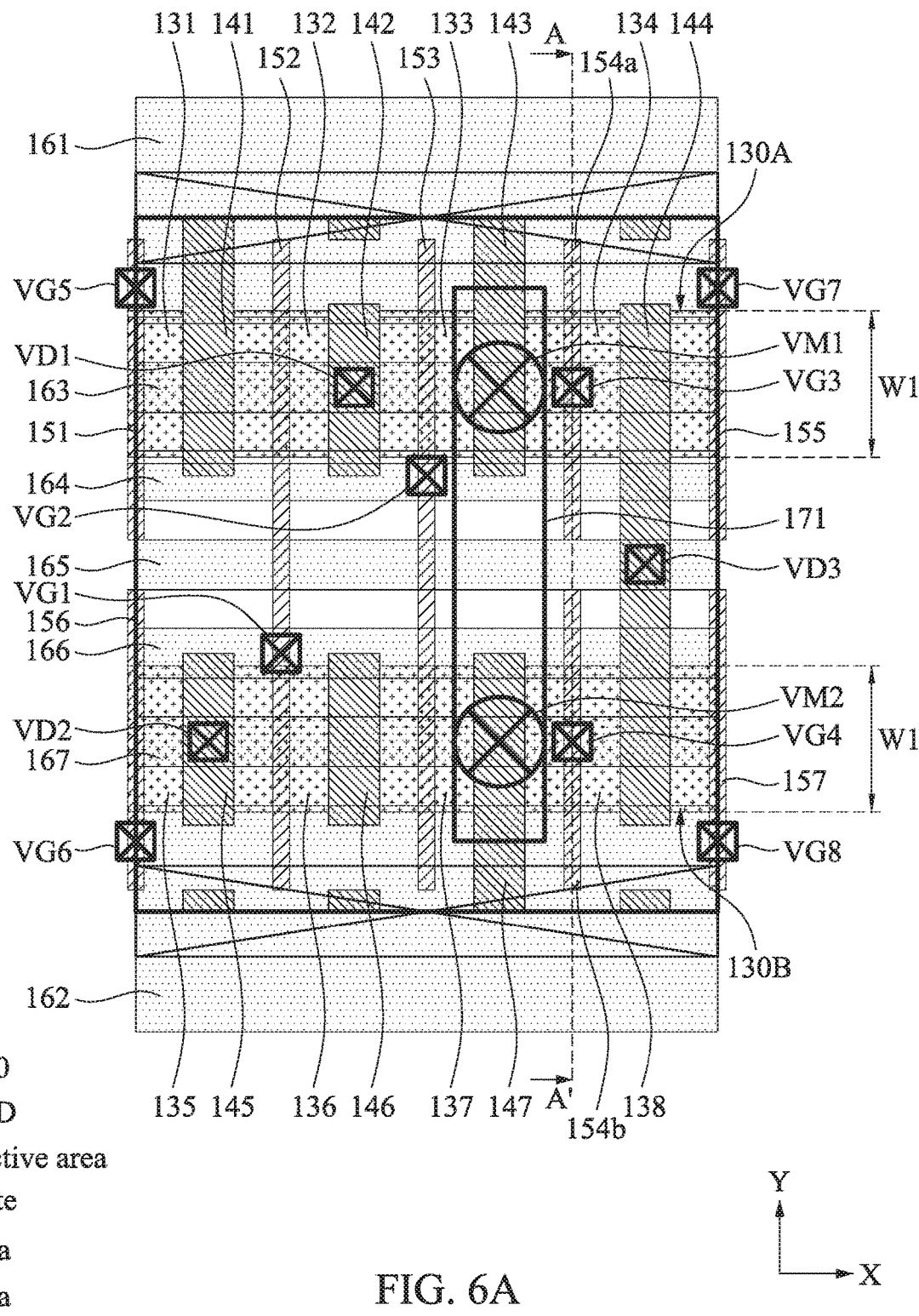
FIG. 6A is another layout diagram in the plan view of part of the integrated circuit corresponding to a part of FIG. 1B, in accordance with various embodiments.

Reference is now made to FIG. 6A. FIG. 6A is another layout diagram in the plan view of part of the integrated circuit 100 corresponding to a part of FIG. 1B, in accordance with various embodiments. With respect to the embodiments of FIG. 6A, like elements in FIG. 2A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 6A.

Compared with FIG. 2A, as shown in FIG. 6A, instead of having the single gate 154, the integrated circuit 100 includes gates 154a-154b. The gates 154a-154b are configured with respect to the gate 154 of FIG. 2A. For illustration, the gates 154a-154b align with each other in a y direction, and are separate from each other in y direction. The via VG3 is disposed on the gate 154a, and the via VG4 is disposed on the gate 154b.

In some embodiments, the gates 154a-154b are formed by implementing a cut layer (not shown) at the middle of the gate 154. In some embodiments, the cut layer has a width, in y direction, which is the same as the width of the conductive segment 165.

Figure 6B:
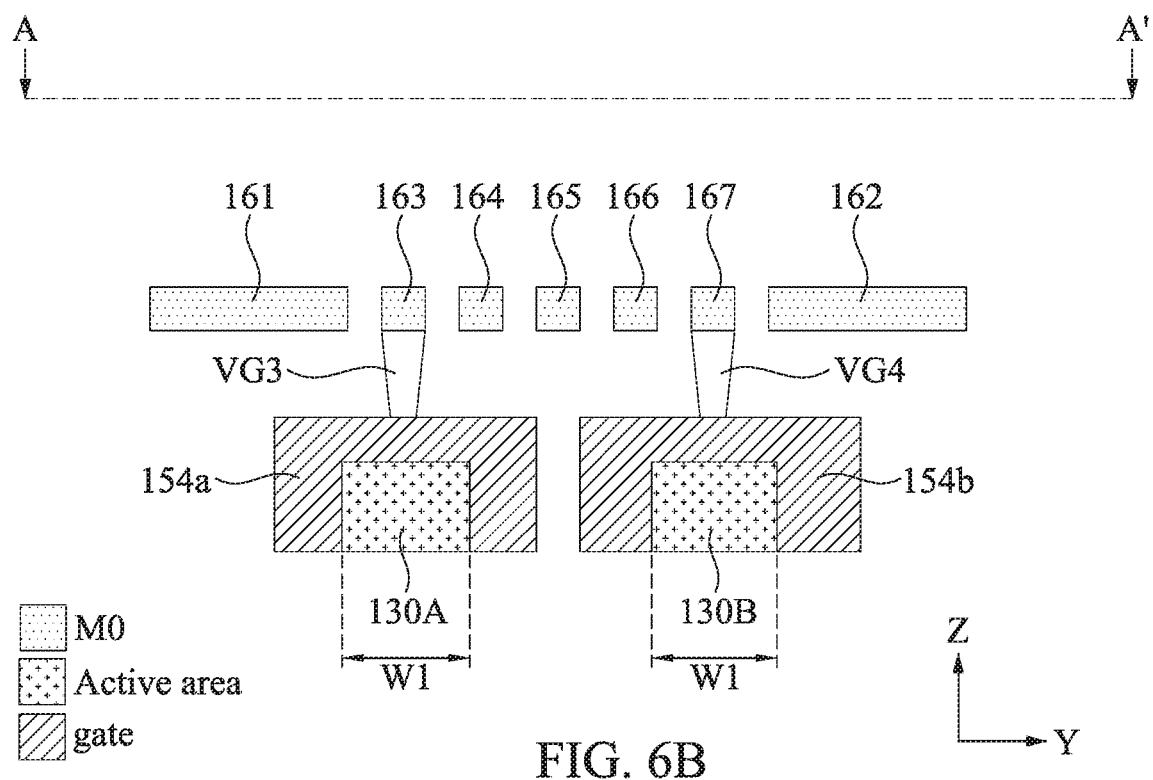
FIG. 6B is a cross-sectional view of part of the integrated circuit in FIG. 6A, in accordance with various embodiments.

Reference is now made to FIG. 6B. FIG. 6B is a cross-sectional view of part of the integrated circuit 100 in FIG. 6A, in accordance with various embodiments.

With respect to the embodiments of FIG. 6B, like elements in FIG. 2B are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 6B.

Compared with FIG. 2B, instead of the gate 154 being a single gate structure, the two separate gates 154a-154b are separate from each other in y direction.

The configurations of FIGS. 6A-6B are given for illustration purposes. Various implements of FIGS. 6A-6B are within the contemplated scope of the present disclosure. For example, in some embodiments, the vias VG3-VG4 do not align the centers of the active areas 130A-130B.

Based on the above discussions of FIGS. 1A-6B, in some embodiments, as the logic gate 120 includes the transistors M5-M6, a threshold voltage of the logic gate 120 having the separated gates 154a-154b is lower than that of the logic gate 120 having the single gate 154.

Furthermore, in various embodiments, since the conductive path through gate structure in FIG. 6A is cut (i.e., the gates 154a-154b corresponding to the gate 154 are separate from each other), instead of having two conductive paths as illustrated in FIG. 2A, there is one conductive path provided by the conductive line 171. Accordingly, the resistance generated by the routing structure of FIG. 6A is, for example, about 2% higher than that of FIG. 2A, in some embodiments.

Figure 7A:
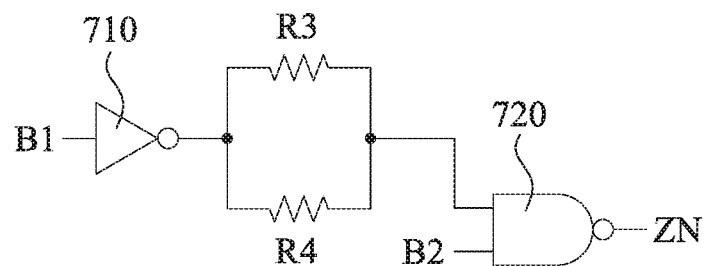
FIG. 7A is an equivalent circuit of part of an integrated circuit, in accordance with various embodiments.

Reference is now made to FIG. 7A. FIG. 7A is an equivalent circuit of part of an integrated circuit 700, in accordance with various embodiments. For illustration, the integrated circuit includes logic gates 710-720. A first terminal of the logic gate 710 is coupled to a signal B1. A second terminal of the logic gate 710 is coupled to a first terminal of the logic gate 720 through resistors R3-R4. The resistors R3-R4 are coupled in parallel. A second terminal of the logic gate 720 is coupled to a signal B2. A third terminal of the logic gate 720 is as an output terminal ZN. In some embodiments, the logic gate 710 is an inverter and the logic gate 720 is a NAND gate. In various embodiments, the logic gate 710 is referred as a first stage circuit, and the logic gate 720 is referred as a second stage circuit. The configurations of the integrated circuit 700 are given for illustrative purposes. Various implements of the integrated circuit 700 are within the contemplated scope of the present disclosure. For example, in some embodiments, the integrated circuit 700 is a logic gate circuit including AND, OR, NAND, MUX, Flip-flop, Latch, BUFF or any other types of logic circuit.

In some embodiments, the resistor R3 represents a resistance contributed by part of the routing arranged to couple the first terminal of the logic gate 710 with the logic gate 720. Similarly, the resistor R4 represents a resistance contributed by another part of the routing arranged to couple the first terminal of the logic gate 710 with the logic gate 720. The details of the configuration of the resistors R3 and R4 will be discussed in the following paragraphs.

Figure 7B:
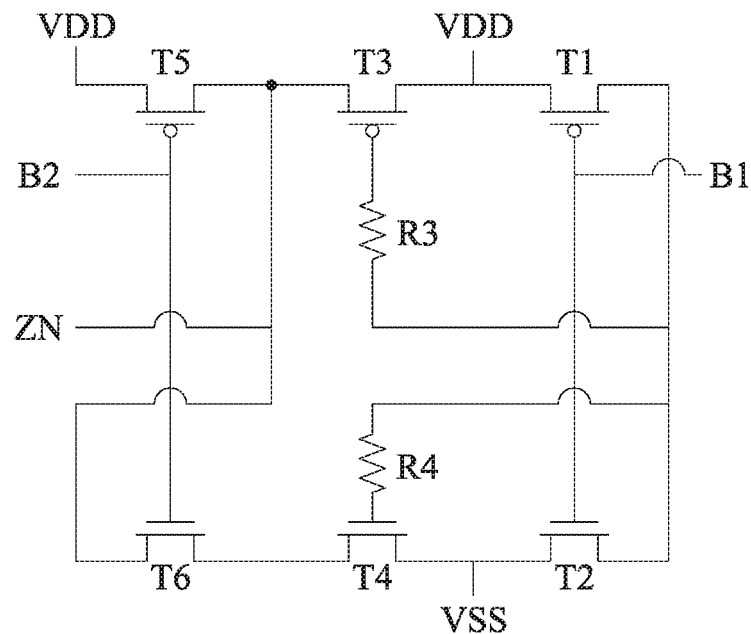
FIG. 7B is a detailed circuit corresponding to the equivalent circuit of part of the integrated circuit in FIG. 7A, in accordance with various embodiments.

Reference is now made to FIG. 7B. FIG. 7B is a detailed circuit corresponding to the equivalent circuit of part of the integrated circuit 700 in FIG. 7A, in accordance with various embodiments. For illustration, the integrated circuit 700 includes transistors T1-T6 coupled between the supply voltages VDD and VSS. With respect to the logic gates 710-720 of FIG. 7A, in some embodiments, the logic gate 710 includes the transistors T1-T2. The logic gate 720 includes the transistors T3-T6.

In some embodiments, the transistors T1, T3, and T5 are P-type transistors, and the transistors T2, T4, and T6 are N-type transistors. The configurations of the transistors T1-T6 are given for illustrative purposes. Various implements of FIG. 1A are within the contemplated scope of the present disclosure. For example, in some embodiments, the transistors T1, T3, and T5 are N-type transistors, and the transistors T2, T4, and T6 are P-type transistors.

With reference to FIG. 7B, gates of the transistors T1-T2 are coupled with each other and are configured to be, for example, as the first terminal of the logic gate 710 to be coupled to the signal B1. Gates of the transistors T3-T4 are coupled to each other, and drain terminals of the transistors T1 and T2 through the resistors R3-R4, and the gates of the transistors T3-T4 are configured to be, for example, the first terminal of the logic gate 720. Gates of the transistors T5-T6 are coupled with each other and are configured to be, for example, the second terminal of the logic gate 720 to be coupled to the signal B2. Source terminals of the transistor T1, T3, and T5 are coupled to the supply voltage VDD. A drain terminal of the transistor T2 is coupled to a drain terminal of the transistor T1. Source terminals of the transistors T2 and T4 are coupled to the supply voltage VSS. A drain terminal of the transistor T4 is coupled to a drain/source terminal of the transistor T6. A source/drain terminal of the transistor T6 and a drain terminal of the transistor T5 are coupled to each other and are configured to be the third terminal of the logic gate 720.

Figure 8A:
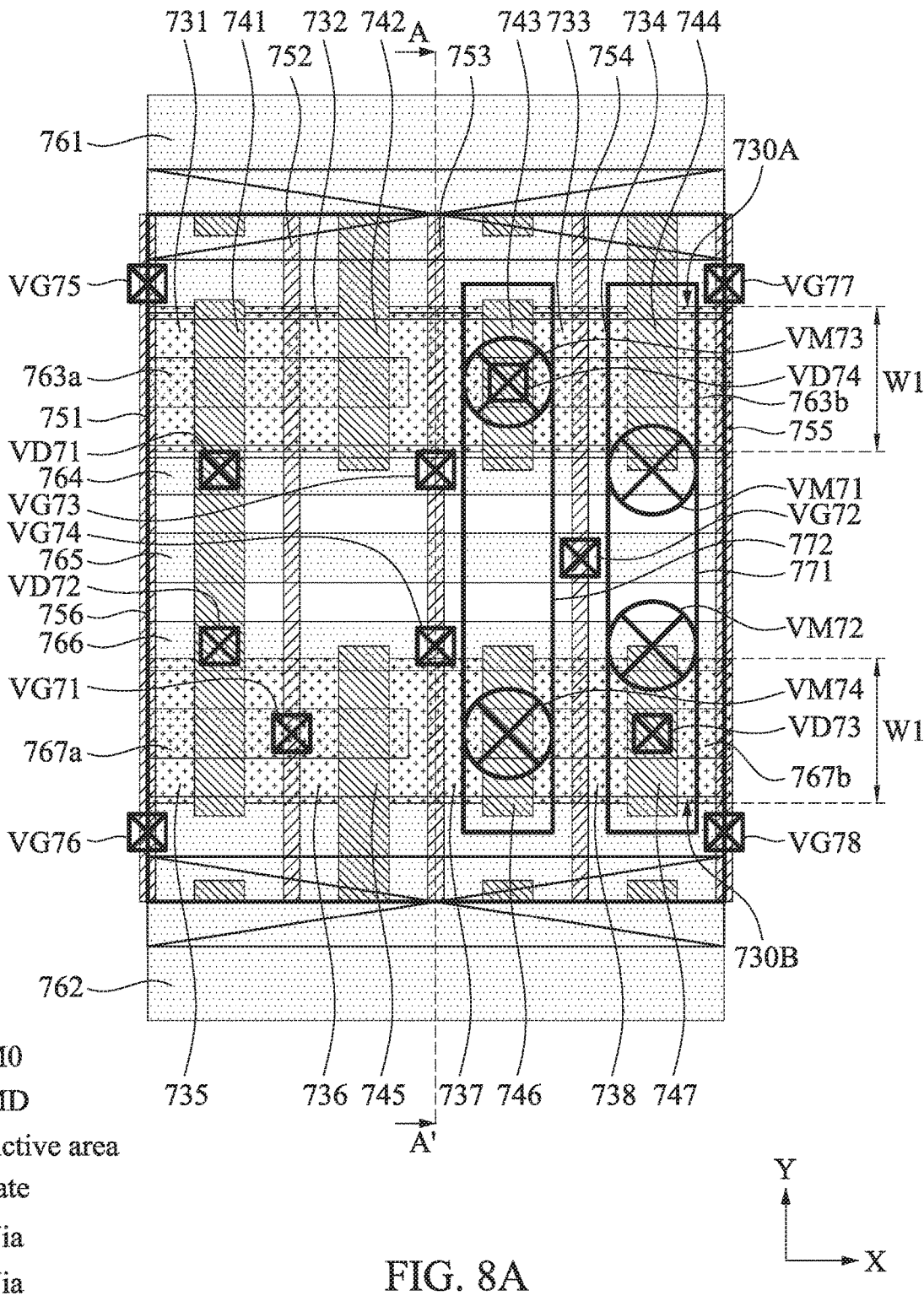
FIG. 8A is a layout diagram in the plan view of part of the integrated circuit corresponding to a part of FIG. 7B, in accordance with various embodiments.

Reference is now made to FIG. 8A. FIG. 8A is a layout diagram in a plan view of part of the integrated circuit 700 corresponding to a part of FIG. 7B, in accordance with various embodiments. For illustration, the integrated circuit 700 includes active areas 730A-730B, conductive patterns (metal-to-device, MD) 741-747, gates 751-755, conductive segments (metal-zero segments, M0) 761-762, 763a-763b, 764-766, and 767a-767b, conductive lines 771-772 (metal-one segments, M1), vias VD71-VD74, VG71-VG78, VM1-VM4, and VP71-VP72. In some embodiments, the active areas 730A-730B are disposed in a first layer and the gates 751-755 cross the active areas 730A-730B. The conductive patterns 741-747 are disposed in a second layer above the first layer. The conductive lines 771-772 are disposed in a third layer above the second layer. The vias VD71-VD34, VG71-VG78, and VP71-VP72 are arranged between the first layer and the second layer. The vias VM1-VM4 are arranged between the second layer and the third layer.

With reference to FIGS. 7B and 8A, the active areas 730A-730B are configured for the formation of the transistors T1-T6. The conductive pattern 741 corresponds to the drain terminals of the transistors T1-T2. The conductive pattern 742 corresponds to the source terminals of the transistors T1 and T3. The conductive pattern 743 corresponds to the drain terminals of the transistors T3 and T5. The conductive pattern 744 corresponds to the source terminal of the transistor T5. The conductive pattern 745 corresponds to the source terminals of the transistors T2 and T4. The conductive pattern 746 corresponds to the drain/source terminal of the transistor T6 and the drain terminal of the transistor T4. The conductive pattern 767 corresponds to the source/drain terminal of the transistor T6.

The gate 752 corresponds to the gates of the transistors T1-T2. The gate 753 corresponds to the gates of the transistors T3-T4. The gate 754 corresponds to the gates of the transistors T5-T6. Alternatively stated, the gate 752 is shared by the transistors T1-T2. The gate 753 is shared by the transistors T3-T4. The gate 754 is shared by the transistors T5-T6. The gates 751 and 755 are referred to as the dummy gates.

As shown in FIG. 8A, for illustration, the active areas 730A-730B extend in x direction and are separate from each other in y direction different from x direction. The active areas 730A-730B have the widths W1 in y direction. In some embodiments, the active area 130A includes active regions 731-734, and the active area 130B includes active regions 735-738. The arrangements of the active areas 730A-730B are similar to that of the active areas 130A-130B of FIG. 2A. Therefore, the repetitious descriptions are omitted here for brevity.

For illustration, the conductive patterns 741-747 extend in y direction. The conductive pattern 741 is disposed on and coupled to the active regions 731 and 735. The conductive patterns 742-747 are disposed on and coupled to the active regions 732-734, and 736-738 separately.

The gates 751-755 extend in y direction and are separate from each other in x direction. As shown in FIG. 8A, the gates 751-755 cross both the active areas 730A-730B.

The conductive segments 761-762, 763a-763b, 764-766, and 767a-767b extend in x direction and are separate from each other in y direction. The conductive segments 761, 763a-763b, 764 overlap the active area 730A. The conductive segments 762, 766, and 767a-767b overlap the active area 730B.

The configurations of the conductive segments 761-762, 763a-763b, 764-766, and 767a-767b are given for illustrative purposes. Various implements of the conductive segments 761-762, 763a-763b, 764-766, and 767a-767b are within the contemplated scope of the present disclosure. For example, in some embodiments, the conductive segments 761-762 do not overlap the active areas 730A-730B.

The conductive lines 771-772 extend in y direction and overlap the active areas 730A-730B, and the conductive segments 761-762, 763b, 764-766, and 767b. In some embodiments, the conductive line 771 is interposed between the gates 754-755. The conductive line 772 is interposed between the gates 753-754.

For illustration, the via VP71 is coupled between the conductive segment 761 and the conductive patterns 742 and 744. In some embodiments, the conductive segment 761 outputs the supply voltage VDD to the conductive patterns 742 of the transistors T1 and T3 and the conductive pattern 744 of the transistors T3 and T5 of FIG. 7B through the via VP71. The via VP72 is coupled between the conductive segment 762 and the conductive pattern 745. In some embodiments, the conductive segment 762 receives the supply voltage VSS for the conductive pattern 745 of the transistors T2 and T4 of FIG. 7B through the via VP72.

The via VD71 is coupled between the conductive segment 764 and the conductive pattern 741. The via VD72 is coupled between the conductive segment 766 and the conductive pattern 141. The via VD73 is coupled between the conductive segment 767b and the conductive pattern 747. The via VD74 is coupled between the conductive segment 763b and the conductive pattern 743.

The via VG71 is coupled between the conductive segment 767a and the gate 752. In some embodiments, the conductive segment 767a outputs the signal B1 to the gates of the transistors T1-T2 of FIG. 7B. The via VG72 is coupled between the conductive segment 765 and the gate 754. In some embodiments, the conductive segment 765 outputs the signal B2 to the gates of the transistors T5-T6 of FIG. 7B. The vias VG73-VG74 are disposed on and coupled to the gate 753. As shown in FIG. 8A, the via VG73 couples the gate 753 to the conductive pattern 741 through the conductive segment 764 and the via VD71. The via VG4 couples the gate 753 to the conductive pattern 741 through the conductive segment 766 and the via VD72. In addition, the vias VG75-VG76 are disposed on and coupled to the gate 751, and the vias VG77-78 are disposed on and coupled to the gate 755. In some embodiments, the gates VG75 and VG77 are coupled to the conductive segment 761, and the gates VG76 and VG78 are coupled to the conductive segment 762.

The via VM71 is disposed on and coupled to the conductive segment 764, and the via VM72 is disposed on and coupled to the conductive segment 766. The vias VM71-VM72 are further coupled to the conductive line 771. Accordingly, the conductive segment 764 is coupled to the conductive segment 766 through the via VM71, the conductive line 771, and the via VM72. Furthermore, the via VM73 is disposed on and coupled to the conductive segment 763b, and the via VM74 is disposed on and coupled to the conductive segment 767b. The vias VM3-VM4 are further coupled to the conductive line 772. Accordingly, the conductive pattern 743 is coupled to the conductive pattern 746 through the via VD74, the conductive segment 763b, the via VM73, the conductive line 772, the via VM74, the conductive segment 767b, and the via VD73.

The configurations of the vias VM71-VM74 are given for illustrative purposes. Various implements of the vias VM71-VM74 are within the contemplated scope of the present disclosure. For example, in some embodiments, the vias VM71-VM72 have tapered shapes which include a larger area contacting the conductive line 771, compared with an area contacting the conductive segments 764 and 766.

With reference to FIGS. 7B and 8A, as discussed above, the gate 753 corresponds to the gates of the transistors T3-T4, while the conductive line 771 is further coupled to the gate 753. In such embodiments, the gate 753, the vias VG73-VG74, the conductive segments 764 and 766, the vias VM71-VM72, and the conductive line 771 are included in the routing structure which contributes to the resistance of the resistor R3 or R4 of FIG. 7B. Accordingly, when the resistance generated by the routing structure is reduced, the equivalent resistance of the resistor R3 or R4 is reduced correspondingly.

Continuing with the aforementioned discussions, in some approaches, transistors, corresponding to the transistors T3-T4, share a gate corresponding to the gate 753, in which the gate is not coupled to an extra metal line corresponding to, for example, the conductive line 771. In such approaches, a signal transmitted in the gate 753 experiences high resistance contributed by the gate 753. Compared with the approaches, with the configurations of FIG. 8A, a signal transmitted in the gate 753 is also transmitted through the conductive line 771. Alternatively stated, two paths coupled in parallel for transmitting the signal are provided, and accordingly the resistance generated by the routing structure between the gates of the transistors T3-T4 of FIG. 7B is reduced. In some embodiments, with the configurations of the FIG. 8A, the resistance is about ¾ of that of some approaches.

In addition, in some embodiments, the arrangements the conductive line 771 is similar to that of the conductive line 171 of FIG. 2A. Accordingly, in such embodiments, the conductive line 771 provides a greater cross-sectional area and a correspondingly much lower resistance, compared with the gate 753. Hence, the resistance generated by the routing structure between the gates of the transistors T3-T4 of FIG. 7B is further reduced.

Moreover, as discussed above respect to the resistance generated by the routing structure between the gates of the transistors M5-M6 of FIG. 1B, the resistance generated by the routing structure between the gates of the transistors T3-T4 of FIG. 7B is further associated with the locations of the vias VG73-VG74 relative to the active areas 730A and 730B. For example, as the embodiments shown in FIG. 8A, the via VG73 is located a distance away from a center, in y direction, of the active area 730A, and the via VG74 is located a distance away from a center, in y direction, of the active area 730B. In such embodiments, for example, the signal from/to the conductive segment 764 transmits through the via VG73 and propagates the distance in the gate 753. Alternatively stated, the signal experiences relative greater resistance, compared with the embodiments of FIG. 2A in which the corresponding via VG3 aligns the center of the active area 130A. The arrangements of the conductive segment 766 and the via VG74 are similar to that of the conductive segments 764 and the via VG73. Therefore, the repetitious descriptions are omitted here for brevity.

The configurations of FIG. 8A are given for illustration purposes. Various implements of FIG. 8A are within the contemplated scope of the present disclosure. For example, in some embodiments, the active areas 730A-730B have larger widths than the width W1, and accordingly, the conductive segments 764-766 fully overlap the active areas 730A-730B. In various embodiments, there are more conductive segments corresponding to the conductive segments 764 or 766 and more vias corresponding to the vias VG73 or VG74, than those are shown in FIG. 8A, for the routing between the transistors T3-T4 of the integrated circuit 700.

Figure 8B:
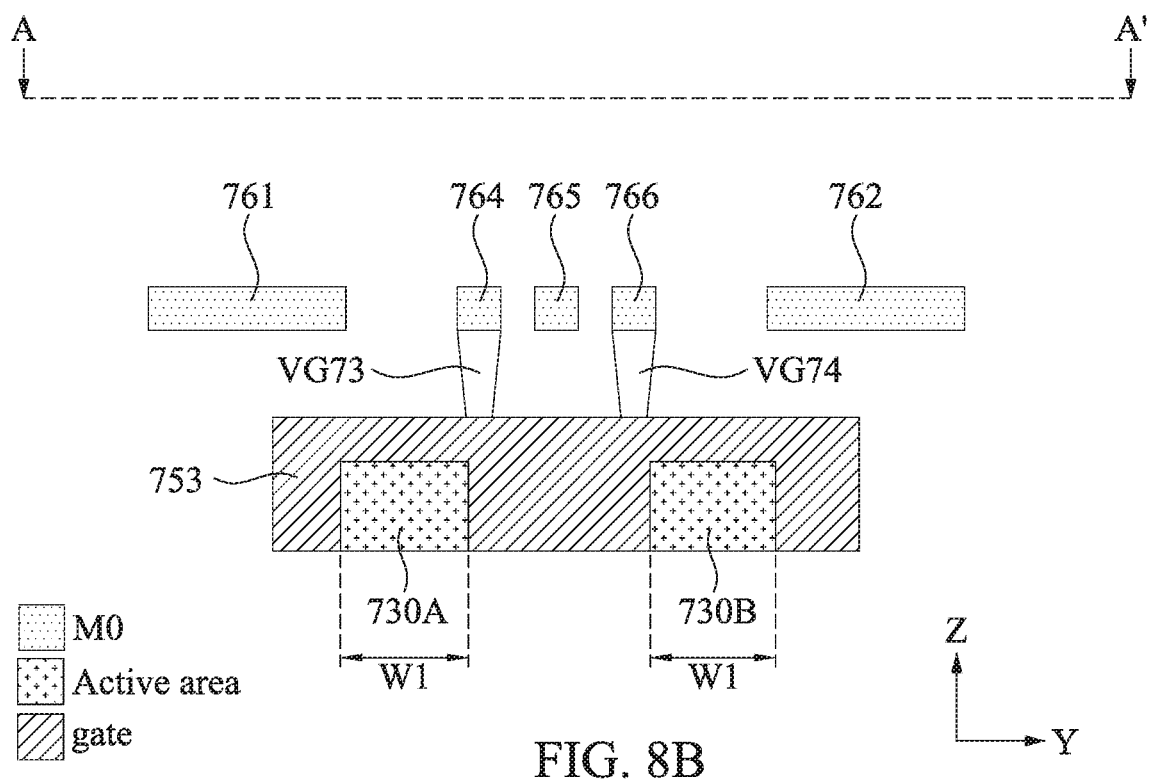
FIG. 8B is a cross-sectional view of part of the integrated circuit in FIG. 8A, in accordance with various embodiments.

Reference is now made to FIG. 8B. FIG. 8B is a cross-sectional view of part of the integrated circuit 700 in FIG. 8A along line AA' in FIG. 8A, in accordance with various embodiments. For illustration, the gate 753 disposes over the active areas 730A-730B, and a part of the gate 753 abuts both the active areas 730A-730B. The vias VG3-VG4 locate away the centers, in y direction, of the active areas 730A-730B, and are separate from each other in y direction.

The arrangements of shapes of the vias VG73-VG74 are similar to that of the vias VG3-VG4 of FIG. 2B. Therefore, the repetitious descriptions are omitted here for brevity.

Figure 9A:
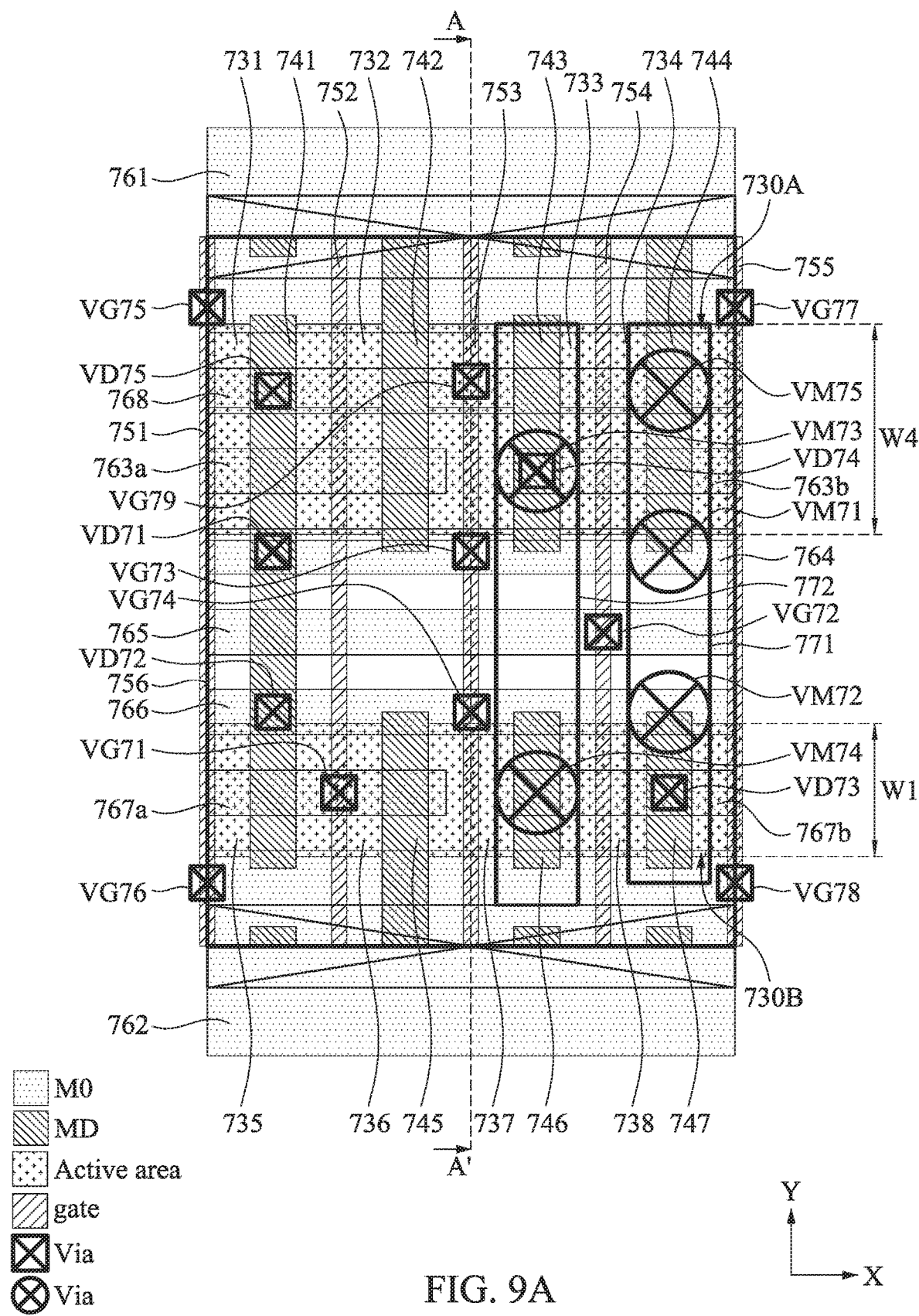
FIG. 9A is another layout diagram in the plan view of part of the integrated circuit corresponding to a part of FIG. 7B, in accordance with various embodiments.

Reference is now made to FIG. 9A. FIG. 9A is another layout diagram in the plan view of part of the integrated circuit 700 corresponding to a part of FIG. 7B, in accordance with various embodiments. With respect to the embodiments of FIG. 9A, like elements in FIG. 8A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 9A.

Compared with FIG. 8A, the integrated circuit 700 further includes vias VD75, VM75, and VG79, a conductive segment 768. The vias VD75, VM75, and VG79 are configured with respect to the vias VD71, VM71, and VG73, separately. The conductive segment 768 is configured with respect to, for example, the conductive segment 764. For illustration, the via VD75 is disposed on and coupled to the conductive pattern 741. The via VG79 is disposed on and coupled to the gate 753. The via VM75 is disposed on and coupled to the conductive segment 768. The conductive segment 768 is coupled to the conductive line 771 through the via VM75.

With reference to FIGS. 7B, 8A, and 9A, in such embodiments of FIG. 9A, the vias VD75, VM75, and VG79, the conductive segment 768 are also included in the routing structure which contributes to the resistance of the resistor R3 or R4 of FIG. 7B. Because the extra path for transmitting the signal in the gate 753 is provided by the vias VD75, VM75, and VG79, the conductive segment 768, and accordingly the resistance generated by the routing structure between the gates of the transistors T3-T4 of FIG. 7B is reduced.

In addition, as the embodiments shown in FIG. 9A, the active area 730A has a width W4. In some embodiments, the width W4 is greater than the width W1 of the active area 730B. Accordingly, in such embodiments, a number of the vias disposed on the portion of the gate 753 crossing the active area 730A is greater than a number of the vias disposed on the portion of the gate 753 crossing the active area 730B. The relationship between the number of vias, configured with respect to the vias VG73 or VG74, and widths of the active areas 730A-730B is similar to that is discussed with respect to the vias VG3-VG4 and the active areas 130A-130B. Therefore, the repetitious descriptions are omitted here for brevity.

The configurations of FIG. 9A are given for illustration purposes. Various implements of FIG. 9A are within the contemplated scope of the present disclosure. For example, in some embodiments, the number of the vias configured with respect to the vias VG73 and VG79 is more than two. Accordingly, the number of the conductive segments configured with respect to the conductive segments 764 and 768 is more than two. In various embodiments, the gate 753 of FIG. 9A is divided into two portions as gates 753a-753b later illustrated in FIG. 10A.

Moreover, in various embodiments, the width of the active area 730B is greater than the width W1. A number of the vias configured with respect to the via VG74 is more than one. The number of the conductive segments configured with respect to the conductive segment 766 is correspondingly more than one. Alternatively stated, the integrated circuit 700 further includes extra paths provided by structures mentioned above for transmitting the signal in the gate 753. Accordingly the resistance generated by the routing structure between the gates of the transistors T3-T4 of FIG. 7B is reduced.

Figure 9B:
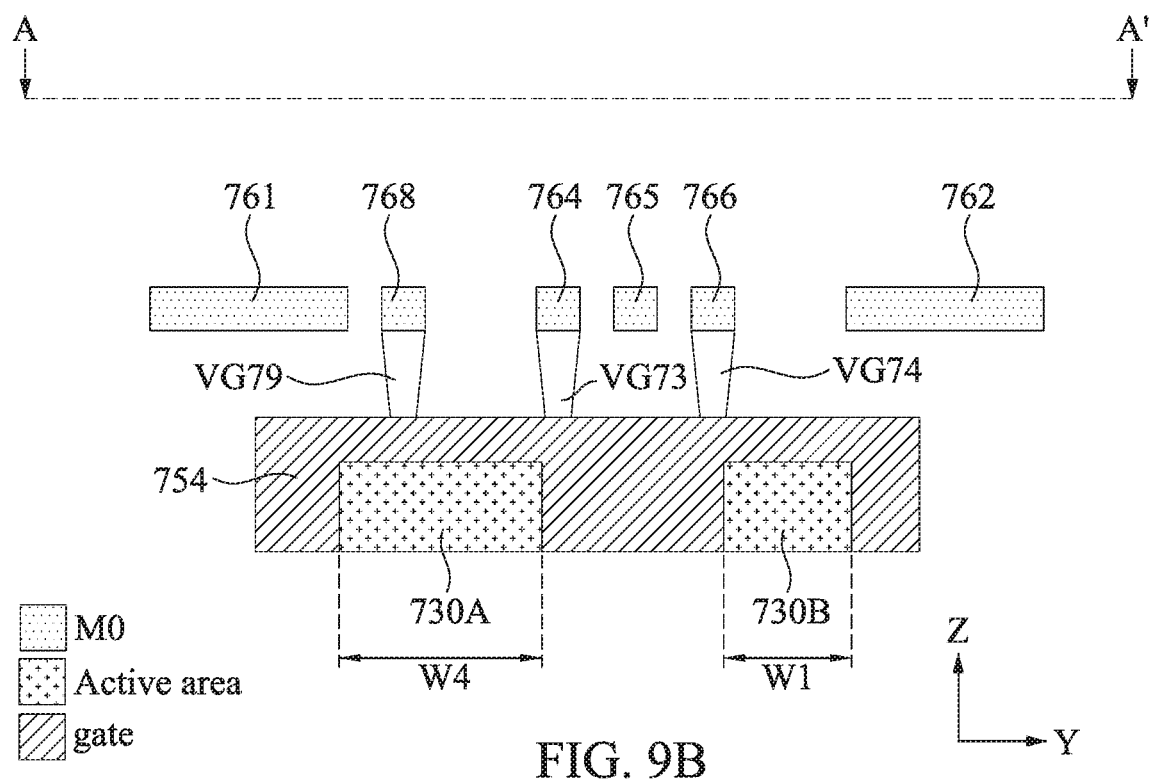
FIG. 9B is a cross-sectional view of part of the integrated circuit in FIG. 9A, in accordance with various embodiments.

Reference is now made to FIG. 9B. FIG. 9B is a cross-sectional view of part of the integrated circuit 700 in FIG. 9A, in accordance with various embodiments. With respect to the embodiments of FIG. 9B, like elements in FIG. 8B are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 9B.

Compared with FIG. 8B, the integrated circuit 700 further includes the via VG79 and the conductive segment 768. The VG79 is disposed away from the via VG73 by a distance. The configurations of FIG. 9B are given for illustration purposes. Various implements of FIG. 9B are within the contemplated scope of the present disclosure. For example, in some embodiments, the via VG79 aligns the centers, in y direction, of the active area 730A having the width W4.

Figure 10A:
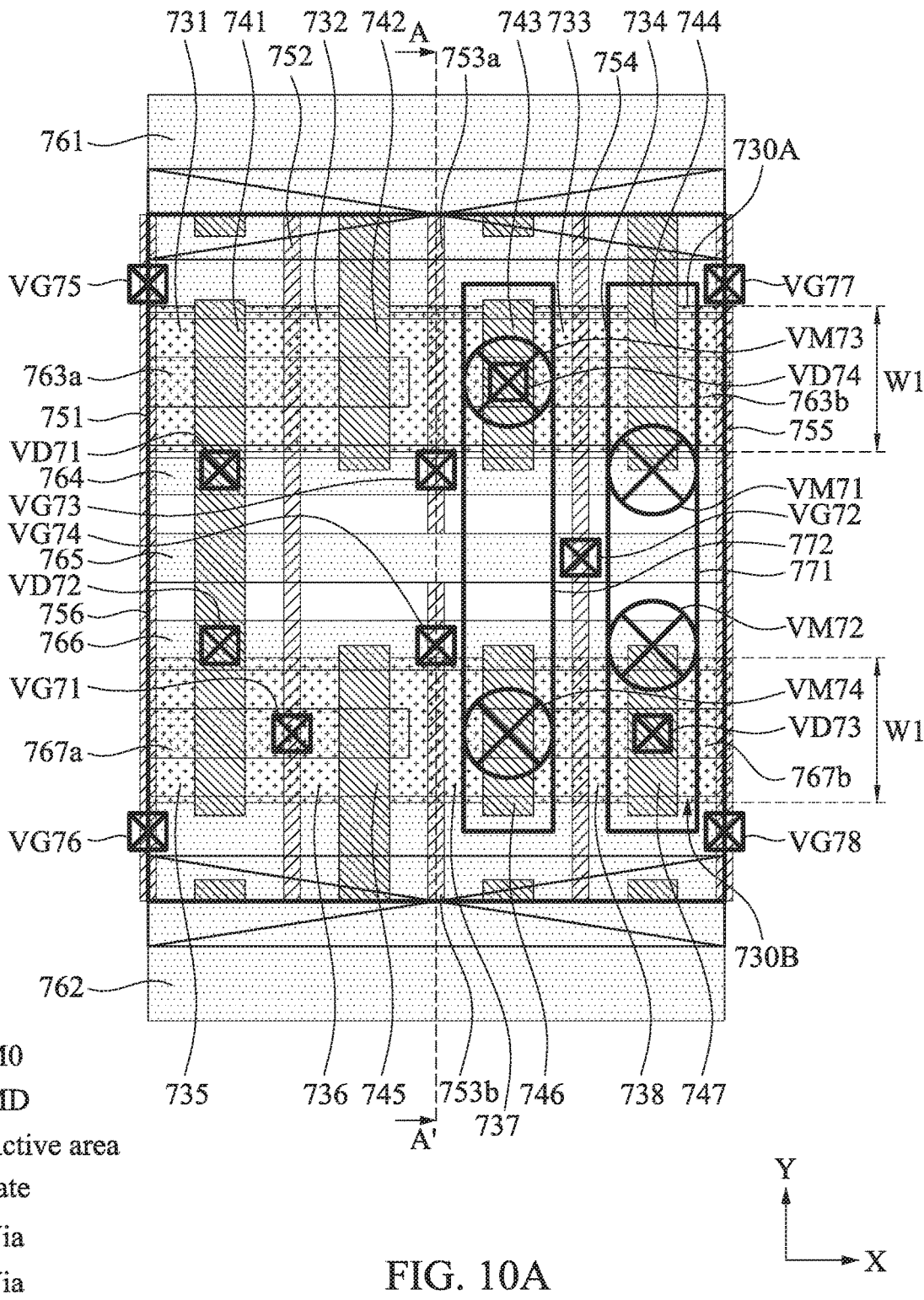
FIG. 10A is another layout diagram in the plan view of part of the integrated circuit corresponding to a part of FIG. 7B, in accordance with various embodiments.

Reference is now made to FIG. 10A. FIG. 10A is another layout diagram in the plan view of part of the integrated circuit 700 corresponding to a part of FIG. 7B, in accordance with various embodiments. With respect to the embodiments of FIG. 10A, like elements in FIG. 8A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 10A.

Compared with FIG. 8A, as shown in FIG. 10A, instead of having the single gate 753, the integrated circuit 700 includes gates 753a-753b. The gates 753a-753b are configured with respect to the gate 753 of FIG. 8A. For illustration, the gates 753a-753b align with each other in a y direction, and are separate from each other in y direction. The via VG73 is disposed on the gate 753a, and the via VG74 is disposed on the gate 753b.

In some embodiments, the gates 753a-753b are formed by implementing a cut layer (not shown) at the middle of the gate 753. In some embodiments, the cut layer has a width, in y direction, which is the same as the width of the conductive segment 765.

Furthermore, in various embodiments, since the conductive path through gate structure in FIG. 10A is cut (i.e., the gates 753a-753b corresponding to the gate 753 is separate from each other), instead of having two paths as illustrated in FIG. 9A, there is only one conductive path provided by the conductive line 771.

Accordingly, the resistance generated by the routing structure of FIG. 10A can be, for example, about 4% higher than that of FIG. 9A.

Figure 10B:
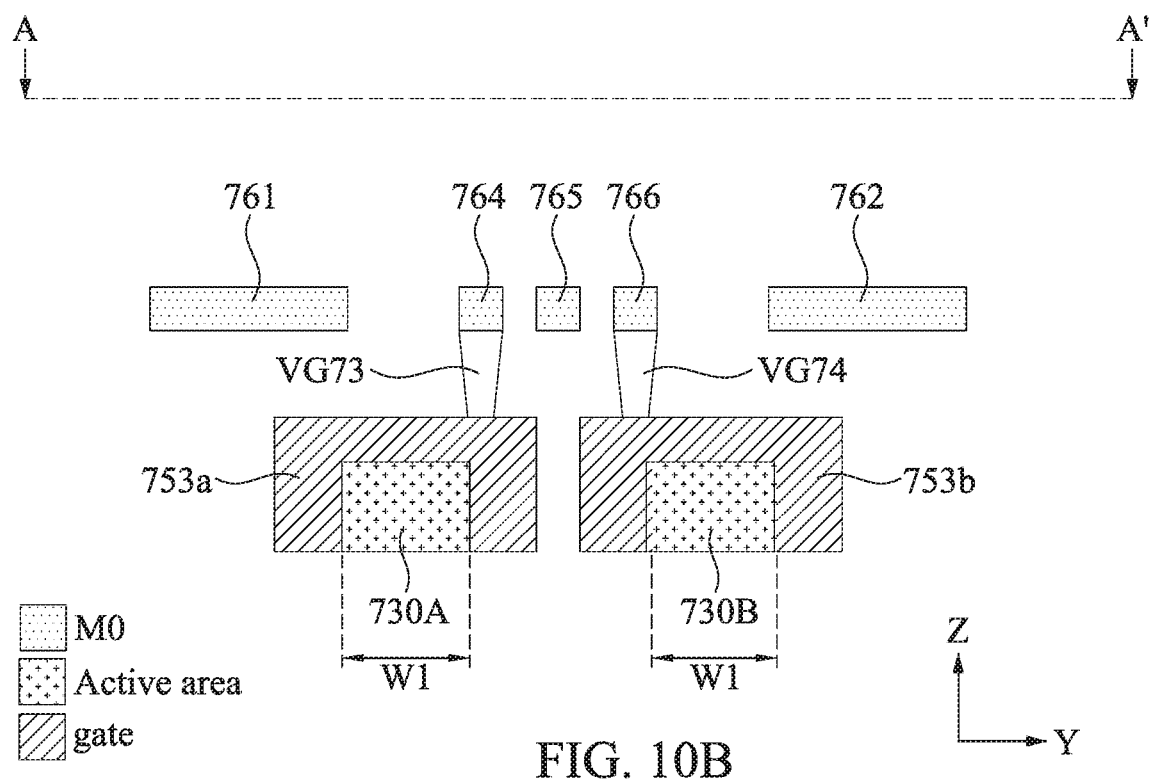
FIG. 10B is a cross-sectional view of part of the integrated circuit in FIG. 10A, in accordance with various embodiments.

Reference is now made to FIG. 10B. FIG. 10B is a cross-sectional view of part of the integrated circuit 700 in FIG. 10A, in accordance with various embodiments. With respect to the embodiments of FIG. 10B, like elements in FIG. 8B are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 10B.

Compared with FIG. 8B, instead of the gate 753 being a single gate structure, the two separate gates 753a-753b are separate from each other in y direction.

The configurations of FIGS. 10A-10B are given for illustration purposes. Various implements of FIGS. 10A-10B are within the contemplated scope of the present disclosure. For example, in some embodiments, the widths of the active areas 730A-730B are wider than the width W1, and accordingly the integrated circuit 700 includes more vias corresponding to the vias VG73 or VG74.

Figure 11:
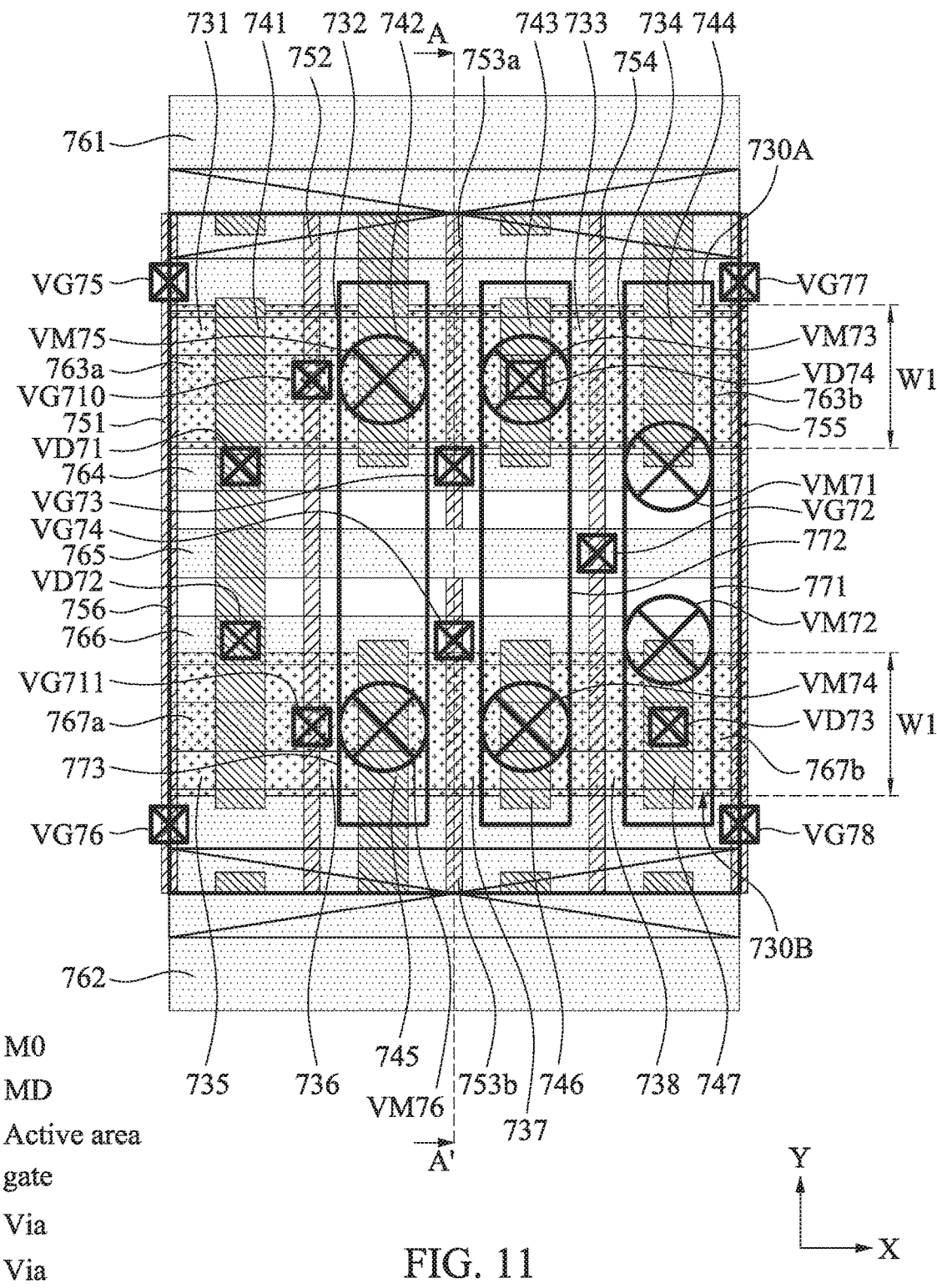
FIG. 11 is another layout diagram in the plan view of part of the integrated circuit corresponding to a part of FIG. 7B, in accordance with various embodiments.

Reference is now made to FIG. 11. FIG. 11 is another layout diagram in the plan view of part of the integrated circuit 700 corresponding to a part of FIG. 7B, in accordance with various embodiments. With respect to the embodiments of FIG. 11, like elements in FIG. 8A are designated with the same reference numbers for ease of understanding. The specific operations of similar elements, which are already discussed in detail in above paragraphs, are omitted herein for the sake of brevity, unless there is a need to introduce the co-operation relationship with the elements shown in FIG. 11.

Compared with FIG. 8A, as shown in FIG. 11, the integrated circuit 700 further includes vias VM76-VM77, and VG710-VG711, a conductive line 773. The vias VM76 and VM77 are configured with respect to the vias VM71 and VM72, respectively. The vias VG710 and VG711 are configured with respect to the vias VG73 and VG74, respectively. The conductive line 773 is configured with respect to, for example, the conductive line 771. For illustration, the via VM76 is disposed on and coupled to the conductive segment 763a. The via VM77 is disposed on and coupled to the conductive segment 767b. The vias VM76-VM77 are further coupled to the conductive line 773. The vias VG710-VG711 are disposed on and coupled to the gate 752. Accordingly, in such arrangements, the gate 752 is coupled with the conductive line 773 through the vias VG710-711, the conductive segments 763a and 767a, and the conductive line 773.

With reference to FIGS. 7B, 8A and 11, in such embodiments of FIG. 11, the vias VM76-VM77, and VG710-VG711, the conductive line 773 are also included in a routing structure, between the gates of the transistors T1-T2 of FIG. 7B, which contributes a resistance. Because an extra path for transmitting a signal in the gate 752 is provided by the vias VM76-VM77, and VG710-VG711, the conductive line 773, and accordingly the resistance generated by the routing structure between the gates of the transistors T1-T2 of FIG. 7B is reduced.

The features of the relationship between the vias VM76-VM77, VG710-VG711, the conductive line 773 and the resistance generated by the routing structure thereof are similar to that of the vias VM71-VM72, VG73-VG74, and the conductive line 771. Therefore, the repetitious descriptions are omitted here for brevity.

The configurations of FIG. 11 are given for illustration purposes. Various implements of FIG. 11 are within the contemplated scope of the present disclosure. For example, in some embodiments, as the widths of the active areas 730A and/or 730B increase, the vias VM71-VM76, VG73-VG74, VG710-VG711, the conductive segments 763a, 767a, 764, 766, or the combinations thereof are implements with multiple corresponding structures for further reducing the resistance generated by the routing structures.

Figure 12:
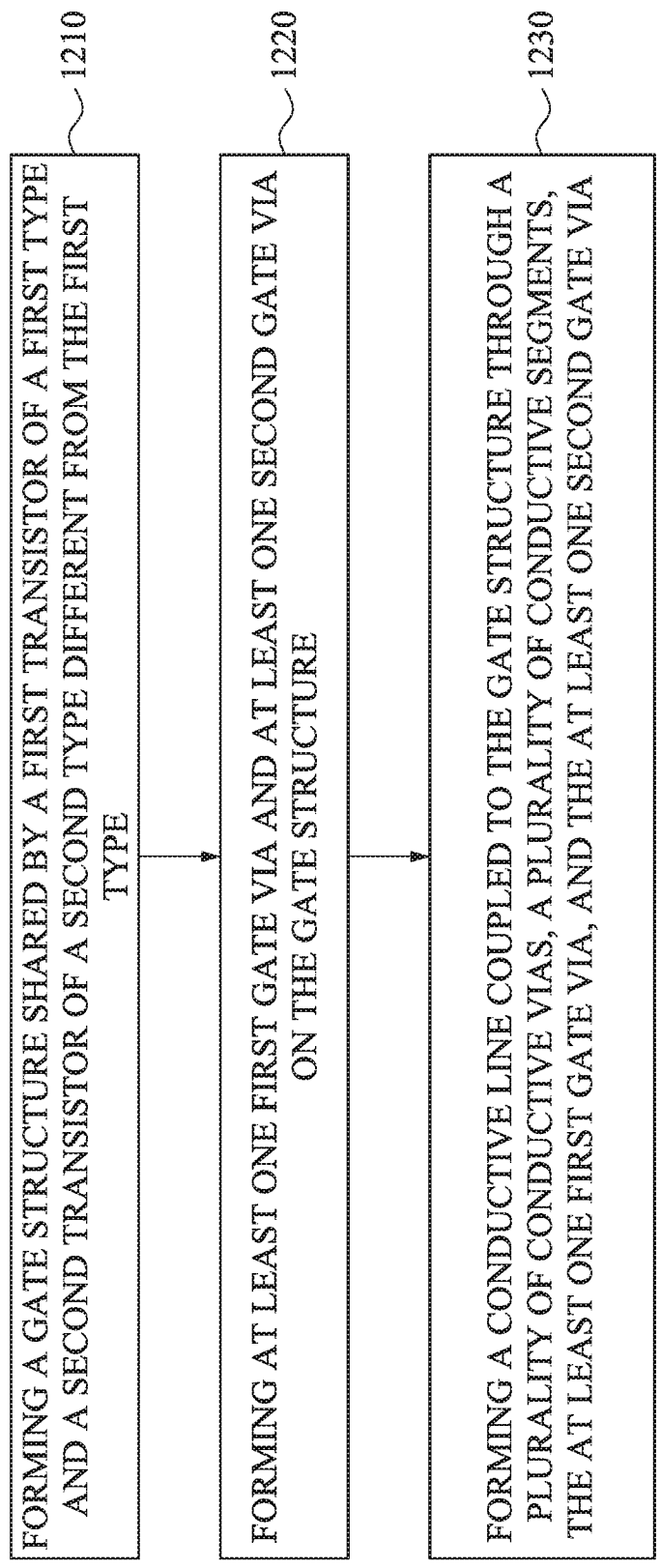
FIG. 12 is a flow chart of a method of fabricating the integrated circuit, in accordance with some embodiments of the present disclosure.

Reference is now made to FIG. 12. FIG. 12 is a flow chart of a method 1200 for manufacturing the integrated circuits 100 or 700, in accordance with some embodiments of the present disclosure. It is understood that additional operations can be provided before, during, and after the processes shown by FIG. 12, and some of the operations described below can be replaced or eliminated, for additional embodiments of the method 1200. The method 1200 includes operations 1210-1230 that are described below with reference to the integrated circuit 100 of FIG. 2A.

In operation 1210, a gate structure shared by a first transistor and a second transistor is formed. The first transistor can be a first type and the second transistor can be a second type, in which the second type is different from the first type. Referring to FIGS. 1B and 1C, the gate 154 is formed and shared by the transistor M5 of P type and the transistor M6 of N type.

In operation 1220, at least one first gate via and at least one second gate via are formed on the gate structure. Referring to FIG. 1C, the vias VG3 and VG4 are formed on the gate 154. In some embodiments, the vias VG3 and VG4 are electrically coupled to the gate 154.

In operation 1230, a conductive line coupled to the gate structure—through a plurality of conductive vias, a plurality of conductive segments, the at least one first gate via, and the at least one second gate via—is formed. In some embodiments, the gate structure and the conductive line extend in a first direction (e.g., a y-direction). Referring to FIG. 1C, the conductive line 171 is formed and coupled to the gate 154 through the vias VM1-VM2, VG3-VG4, and the conductive segments 163 and 167. As shown in FIG. 2A, in some embodiments, the gate 154 and the conductive line 171 extend in the y-direction.

In some embodiments, the ratio of the width of the conductive line 171 over a width of the gate 154 ranges from about 1 to about 20, and the ratio of the height of the conductive line 171 over the height of the gate 154 ranges from about 1 to about 40.

In some embodiments, the method 1200 further includes operation of forming the active area 130A of the transistor M5 and the active area 130B of the transistor M6. The active areas 130A-130B are separated from each other in the y-direction and extend in the x-direction. In some embodiments, the via VG3 aligns with a center of the active area 130A in the y-direction, as shown in FIG. 2A.

In some embodiments, the method 1200 further includes operation of separating, in y direction, a first segment of the gate 154 from a second segment of the gate 154. The first segment is, for example, the gate 154a of FIG. 6A, and the second segment is, for example, the gate 154b of FIG. 6A.

In some embodiments, as discussed above, a resistance of a conductive path with the separated segments, for example, the gates 154a-154b of the gate 154 is greater than that when the first segment and second segment of the gate 154 are merged.

FIG. 13 illustrates a comparison table of gate resistance, in accordance with some embodiments of the present disclosure. As discussed above, the gate resistance (including the metal routing coupled to the gate structure) varies in response to different layouts. In some embodiments, case A corresponds to some approaches that provide a continuous gate structure and a via disposed thereon, without other segments configured with respect to conductive line 171 or 771 of the present disclosure. Case B corresponds to the embodiments of FIG. 8A. Case C corresponds to the embodiments of FIG. 10A. Case D corresponds to the embodiments of FIG. 2A. Case E corresponds to the embodiments of FIG. 6A.

As shown in FIG. 13, comparing case B with case A having the gate resistance being referred as 1×, the gate resistance of case B is 0.75× and smaller than that of case A, due to having more than one vias VG73-VG74 and additional conductive line 771 as shown in FIG. 8A. Alternatively stated, case B provides more conductive paths than case A.

Comparing case C with case B, the gate structure is cut in case C. Less conductive path is included in case C, and accordingly, the gate resistance of case C is 0.79× and greater than that of case B.

Comparing case D with case B, vias in case D are located in centers of active areas. As discussed above, in some embodiments, signal transmitted through conductive segments (M0 layer in FIG. 13) and the vias passes directly into the gate and the active areas without propagating a long distance in the gate. Accordingly, the gate resistance of case D is 0.52× and smaller than that of case B.

Comparing case E with case D, the gate structure is cut in case E. Less conductive path is included in case E, and accordingly, the gate resistance of case E is 0.54× and greater than that of case D.

In addition, even the gate resistance of case C is greater than that of case B, effect of parasitic capacitance of metal routing in case C is smaller than that of case B due to separated gate, in some embodiments. The comparison of effect of parasitic capacitance between cases D and E are similar to cases B and C. Thus, the repetitious descriptions are omitted here.

The configurations of FIG. 13 are given for illustrative purposes. Various implements are within the contemplated scope of the present disclosure. For example, in some embodiments, the gate resistance reduces when more vias are coupled to the gate as shown in the embodiments of FIG. 5A.

Figure 14:
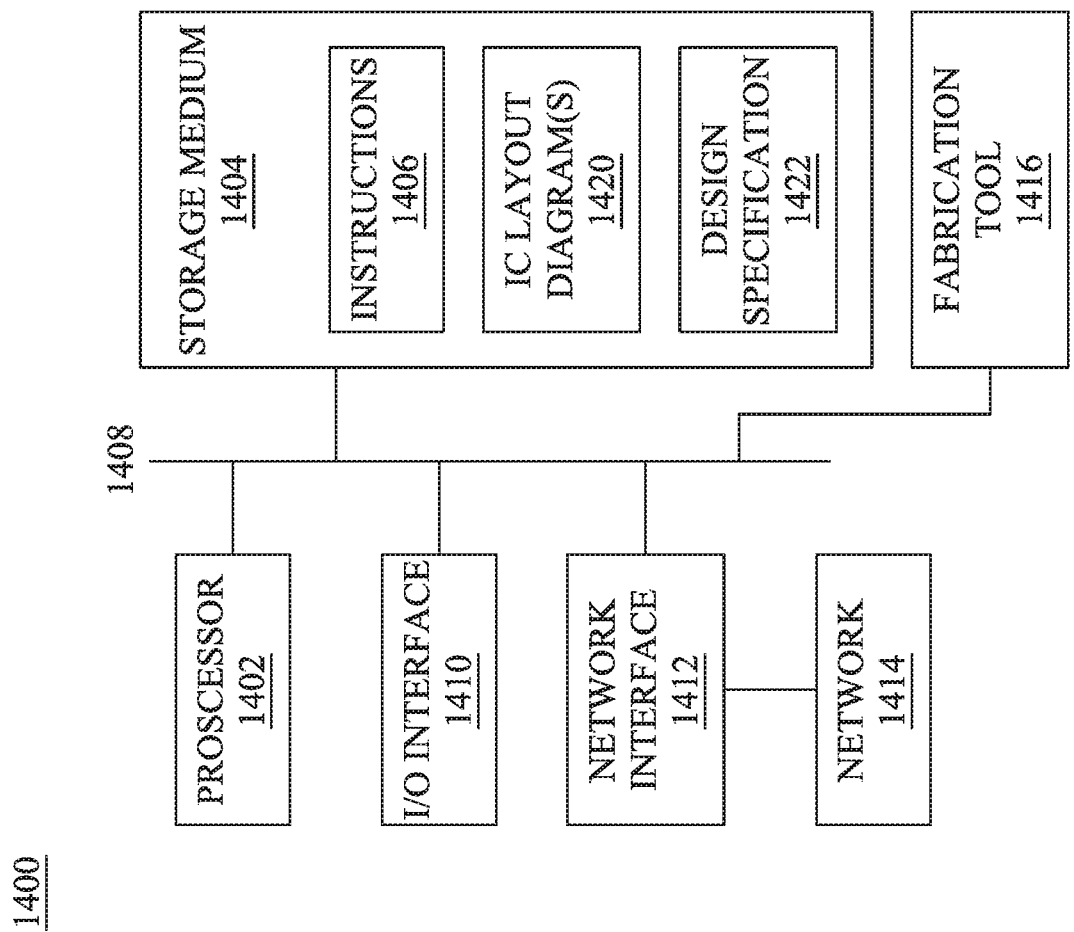
FIG. 14 is a block diagram of a system for designing the integrated circuit layout design, in accordance with some embodiments of the present disclosure.

Reference is now made to FIG. 14. FIG. 14 is a block diagram of an electronic design automation (EDA) system 1400 for designing the integrated circuit layout design, in accordance with some embodiments of the present disclosure. EDA system 1400 is configured to implement one or more operations of the method 1200 disclosed in FIG. 12, and further explained in conjunction with FIGS. 1A-1I. In some embodiments, EDA system 1400 includes an APR system.

In some embodiments, EDA system 1400 is a general purpose computing device including a hardware processor 1402 and a non-transitory, computer-readable storage medium 1404. Storage medium 1404, amongst other things, is encoded with, i.e., stores, computer program code (instructions) 1406, i.e., a set of executable instructions. Execution of instructions 1406 by hardware processor 1402 represents (at least in part) an EDA tool which implements a portion or all of, e.g., the method 1200.

The processor 1402 is electrically coupled to computer-readable storage medium 1404 via a bus 1408. The processor 1402 is also electrically coupled to an I/O interface 1410 and a fabrication tool 1416 by bus 1408. A network interface 1412 is also electrically connected to processor 1402 via bus 1408. Network interface 1412 is connected to a network 1414, so that processor 1402 and computer-readable storage medium 1404 are capable of connecting to external elements via network 1414. The processor 1402 is configured to execute computer program code 1406 encoded in computer-readable storage medium 1404 in order to cause EDA system 1400 to be usable for performing a portion or all of the noted processes and/or methods. In one or more embodiments, processor 1402 is a central processing unit (CPU), a multi-processor, a distributed processing system, an application specific integrated circuit (ASIC), and/or a suitable processing unit.

In one or more embodiments, computer-readable storage medium 1404 is an electronic, magnetic, optical, electromagnetic, infrared, and/or a semiconductor system (or apparatus or device). For example, computer-readable storage medium 1404 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1404 includes a compact disk-read only memory (CD-ROM), a compact disk-read/write (CD-R/W), and/or a digital video disc (DVD).

In one or more embodiments, storage medium 1404 stores computer program code 1406 configured to cause EDA system 1400 (where such execution represents (at least in part) the EDA tool) to be usable for performing a portion or all of the noted processes and/or methods. In one or more embodiments, storage medium 1404 also stores information which facilitates performing a portion or all of the noted processes and/or methods. In one or more embodiments, storage medium 1404 stores IC layout diagram 1420 of standard cells including such standard cells as disclosed herein, for example, a cell including in the integrated circuits 100 and/or 700 discussed above with respect to FIGS. 1A-11.

EDA system 1400 includes I/O interface 1410. I/O interface 1410 is coupled to external circuitry. In one or more embodiments, I/O interface 1410 includes a keyboard, keypad, mouse, trackball, trackpad, touchscreen, and/or cursor direction keys for communicating information and commands to processor 1402.

EDA system 1400 also includes network interface 1412 coupled to processor 1402. Network interface 1412 allows EDA system 1400 to communicate with network 1414, to which one or more other computer systems are connected. Network interface 1412 includes wireless network interfaces such as BLUETOOTH, WIFI, WIMAX, GPRS, or WCDMA; or wired network interfaces such as ETHERNET, USB, or IEEE-1464. In one or more embodiments, a portion or all of noted processes and/or methods are implemented in two or more systems 1400.

EDA system 1400 also includes the fabrication tool 1416 coupled to processor 1402. The fabrication tool 1416 is configured to fabricate integrated circuits, e.g., the integrated circuit 100 and/or 700 illustrated in FIGS. 1A-11, according to the design files processed by the processor 1402.

EDA system 1400 is configured to receive information through I/O interface 1410. The information received through I/O interface 1410 includes one or more of instructions, data, design rules, libraries of standard cells, and/or other parameters for processing by processor 1402. The information is transferred to processor 1402 via bus 1408. EDA system 1400 is configured to receive information related to a UI through I/O interface 1410. The information is stored in computer-readable medium 1404 as design specification 1422.

In some embodiments, a portion or all of the noted processes and/or methods are implemented as a standalone software application for execution by a processor. In some embodiments, a portion or all of the noted processes and/or methods are implemented as a software application that is a part of an additional software application. In some embodiments, a portion or all of the noted processes and/or methods are implemented as a plug-in to a software application. In some embodiments, at least one of the noted processes and/or methods are implemented as a software application that is a portion of an EDA tool. In some embodiments, a portion or all of the noted processes and/or methods are implemented as a software application that is used by EDA system 1400. In some embodiments, a layout diagram which includes standard cells is generated using a suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, for example, one or more of an optical disk, such as a DVD, a magnetic disk, such as a hard disk, a semiconductor memory, such as a ROM, a RAM, a memory card, and the like.

Figure 15:
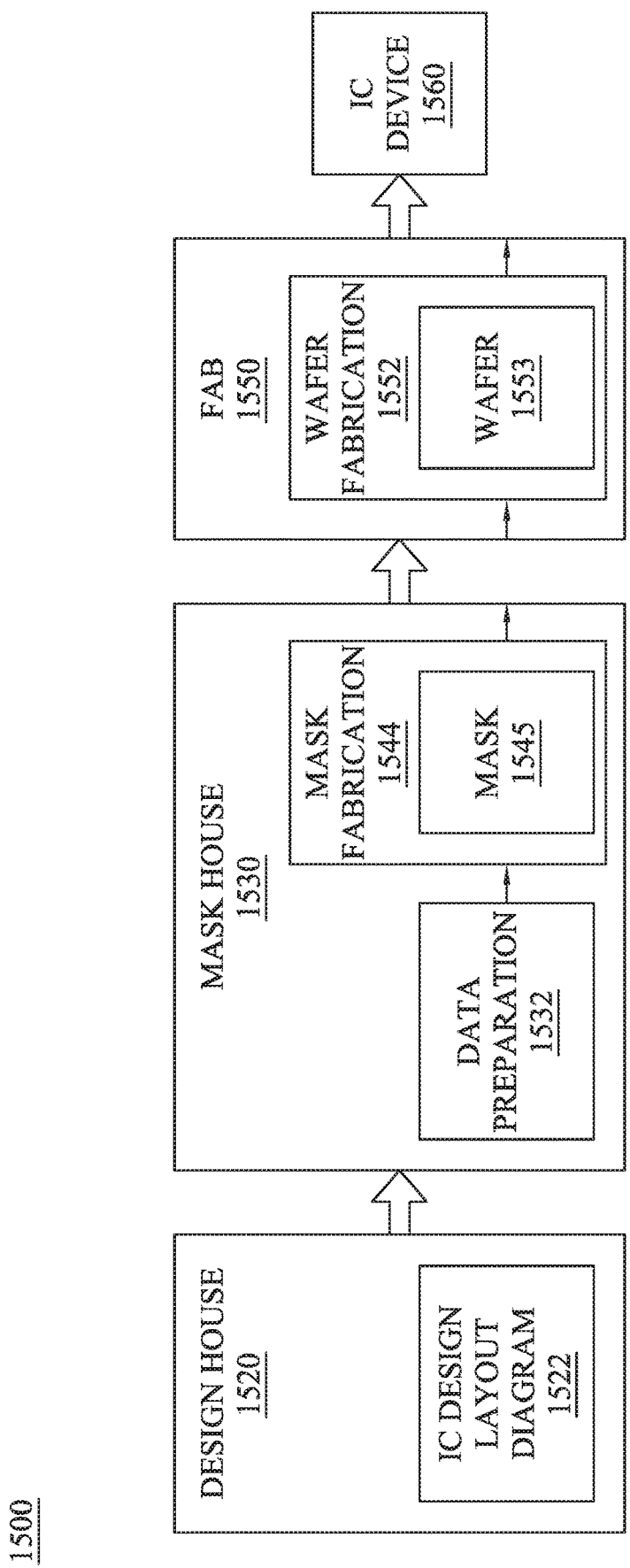
FIG. 15 is a block diagram of an integrated circuit manufacturing system, and an integrated circuit manufacturing flow associated therewith, in accordance with some embodiments.

FIG. 15 is a block diagram of IC manufacturing system 1500, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using IC manufacturing system 1500.

In FIG. 15, IC manufacturing system 1500 includes entities, such as a design house 1520, a mask house 1530, and an IC manufacturer/fabricator ("fab") 1550, that interact with one another in the design, development, and manufacturing cycles and/or services related to manufacturing an IC device 1560. The entities in IC manufacturing system 1500 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1520, mask house 1530, and IC fab 1550 is owned by a single entity. In some embodiments, two or more of design house 1520, mask house 1530, and IC fab 1550 coexist in a common facility and use common resources.

Design house (or design team) 1520 generates an IC design layout diagram 1522. IC design layout diagram 1522 includes various geometrical patterns, for example, an IC layout design depicted in FIGS. 2A, 3, 4A, 5A, 6A, 8A, 9A, 10A, and/or 11, designed for an IC device 1560, for example, integrated circuits 100 and 700 discussed above with respect to FIGS. 2A, 3, 4A, 5A, 6A, 8A, 9A, 10A, and/or 11. The geometrical patterns correspond to patterns of metal, oxide, or semiconductor layers that make up the various components of IC device 1560 to be fabricated. The various layers combine to form various IC features. For example, a portion of IC design layout diagram 1522 includes various IC features, such as an active region, gate electrode, source and drain, conductive segments or vias of an interlayer interconnection, to be formed in a semiconductor substrate (such as a silicon wafer) and various material layers disposed on the semiconductor substrate. Design house 1520 implements a proper design procedure to form IC design layout diagram 1522. The design procedure includes one or more of logic design, physical design or place and route. IC design layout diagram 1522 is presented in one or more data files having information of the geometrical patterns. For example, IC design layout diagram 1522 can be expressed in a GDSII file format or DFII file format.

Mask house 1530 includes data preparation 1532 and mask fabrication 1544. Mask house 1530 uses IC design layout diagram 1522 to manufacture one or more masks 1545 to be used for fabricating the various layers of IC device 1560 according to IC design layout diagram 1522. Mask house 1530 performs mask data preparation 1532, where IC design layout diagram 1522 is translated into a representative data file ("RDF"). Mask data preparation 1532 provides the RDF to mask fabrication 1544. Mask fabrication 1544 includes a mask writer. A mask writer converts the RDF to an image on a substrate, such as a mask (reticle) 1545 or a semiconductor wafer 1553. The IC design layout diagram 1522 is manipulated by mask data preparation 1532 to comply with particular characteristics of the mask writer and/or requirements of IC fab 1550. In FIG. 15, data preparation 1532 and mask fabrication 1544 are illustrated as separate elements. In some embodiments, data preparation 1532 and mask fabrication 1544 can be collectively referred to as mask data preparation.

In some embodiments, data preparation 1532 includes optical proximity correction (OPC) which uses lithography enhancement techniques to compensate for image errors, such as those that can arise from diffraction, interference, other process effects and the like. OPC adjusts IC design layout diagram 1522. In some embodiments, data preparation 1532 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, data preparation 1532 includes a mask rule checker (MRC) that checks the IC design layout diagram 1522 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1522 to compensate for limitations during mask fabrication 1544, which may undo part of the modifications performed by OPC in order to meet mask creation rules.

In some embodiments, data preparation 1532 includes lithography process checking (LPC) that simulates processing that will be implemented by IC fab 1550 to fabricate IC device 1560. LPC simulates this processing based on IC design layout diagram 1522 to create a simulated manufactured device, such as IC device 1560. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1522.

It should be understood that the above description of data preparation 1532 has been simplified for the purposes of clarity. In some embodiments, data preparation 1532 includes additional features such as a logic operation (LOP) to modify the IC design layout diagram 1522 according to manufacturing rules. Additionally, the processes applied to IC design layout diagram 1522 during data preparation 1532 may be executed in a variety of different orders.

After data preparation 1532 and during mask fabrication 1544, a mask 1545 or a group of masks 1545 are fabricated based on the modified IC design layout diagram 1522. In some embodiments, mask fabrication 1544 includes performing one or more lithographic exposures based on IC design layout diagram 1522. In some embodiments, an electron-beam (e-beam) or a mechanism of multiple e-beams is used to form a pattern on a mask (photomask or reticle) 1545 based on the modified IC design layout diagram 1522. Mask 1545 can be formed in various technologies. In some embodiments, mask 1545 is formed using binary technology. In some embodiments, a mask pattern includes opaque regions and transparent regions. A radiation beam, such as an ultraviolet (UV) beam, used to expose the image sensitive material layer (for example, photoresist) which has been coated on a wafer, is blocked by the opaque region and transmits through the transparent regions. In one example, a binary mask version of mask 1545 includes a transparent substrate (for example, fused quartz) and an opaque material (for example, chromium) coated in the opaque regions of the binary mask. In another example, mask 1545 is formed using a phase shift technology. In a phase shift mask (PSM) version of mask 1545, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1544 is used in a variety of processes. For example, such a mask(s) is used in an ion implantation process to form various doped regions in semiconductor wafer 1553, in an etching process to form various etching regions in semiconductor wafer 1553, and/or in other suitable processes.

IC fab 1550 includes wafer fabrication 1552. IC fab 1550 is an IC fabrication business that includes one or more manufacturing facilities for the fabrication of a variety of different IC products. In some embodiments, IC Fab 1550 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1550 uses mask(s) 1545 fabricated by mask house 1530 to fabricate IC device 1560. Thus, IC fab 1550 at least indirectly uses IC design layout diagram 1522 to fabricate IC device 1560. In some embodiments, semiconductor wafer 1553 is fabricated by IC fab 1550 using mask(s) 1545 to form IC device 1560. In some embodiments, the IC fabrication includes performing one or more lithographic exposures based at least indirectly on IC design layout diagram 1522. Semiconductor wafer 1553 includes a silicon substrate or other proper substrate having material layers formed thereon. Semiconductor wafer 1553 further includes one or more of various doped regions, dielectric features, multi-level interconnects, and the like (formed at subsequent manufacturing steps).

As described above, integrated circuits in the present disclosure provide extra conductive paths for transmitting signals in the gate structures of multiple stages circuit. Therefore, the resistance generated by the routing between the gate structures is reduced, and the circuit performance is accordingly improved.

In some embodiments, an integrated circuit is disclosed, including a first gate and a second gate disposed in a first layer, and aligned with each other in a first direction; a first gate via disposed on the first gate and a second gate via disposed on the second gate; at least one first conductive segment and at least one second conductive segment disposed in a second layer above the first layer, in which the first and second conductive segments are coupled to the first and second gate vias respectively; and a first conductive line disposed in a third layer above the second layer and extending in the first direction; in which the first and second gates are configured to be a terminal of a first logic circuit, in which the first conductive line is electrically coupled to the first gate through a first connection via, the first conductive segment, and the first gate via, in which the first conductive line is electrically coupled to the second gate through a second connection via, the second conductive segment, and the second gate via. In some embodiments, the first and second gates are connected to each other as a gate structure extending in the first direction. In some embodiments, the semiconductor structure further includes a first active area and a second active area separated from each other in the first direction and extending in a second direction different from the first direction; in which the at least one first gate via includes multiple first gate vias, and the at least one second gate via includes multiple second gate vias; in which a number of the first gate vias are aligned along a width of the first active area in the first direction, and a number of the second gate vias are aligned along a width of the second active area in the first direction. In some embodiments, the number of the first gate vias increases as the width of the first active area increases. In some embodiments, the at least one first gate via and the at least one second gate via include multiple first gate vias and multiple second gate vias, respectively; in which the number of the first gate vias and the number of the second gate vias are the same. In some embodiments, the semiconductor structure further includes a first active area and a second active area separated from each other in the first direction extending in a second direction different from the first direction; in which the first gate via aligns with a center of the first active area in the first direction and the second gate via aligns with a center of the second active area in the first direction. In some embodiments, the semiconductor structure further includes a third gate and a fourth gate disposed in the first layer, aligned with each other in the first direction; a third gate via disposed on the third gate and a fourth gate via disposed on the fourth gate; a third conductive segment coupled to the third gate and a fourth conductive segment coupled to the fourth gate, in which the third and fourth conductive segments are disposed in the second layer; and a second conductive line disposed in the third layer and extending in the first direction; in which the third and fourth gates are configured to be a terminal of a second logic circuit, the first and second logic circuits coupled to each other.

Also disclosed is an integrated circuit that includes a first pair of transistors including a first gate extending along a first direction; and a first active area and a second active area separated from the first active area in the first direction, in which the first gate crosses the first active area and the second active area; at least one first gate via and at least one second gate via that are coupled to the first gate, in which the at least one first gate via is arranged closer to the first active area than the at least one second gate via is; and a first conductive line electrically coupled to the at least one first gate via and the at least one second gate via; in which the at least one first gate via, the at least one second gate via, and the first conductive line are included in a conductive path coupled to the first of the first pair of transistors. In some embodiments, the at least one first gate via aligns with a center, in the first direction, of the first active area. In some embodiments, the at least one first gate via and the at least one second gate via include multiple first gate vias and multiple second gate vias; in which a resistance of the conductive path is associated with a number of the first gate vias and a number of the second gate vias. In some embodiments, a width of the first active area is based on the number of the first gate vias. In some embodiments, the first gate includes: a first portion and a second portion separated from the first portion in the first direction, in which the at least one first gate via is disposed on the first portion of the first gate, and the at least one second gate via is disposed on the second portion of the first gate. In some embodiments, a ratio of a width of the first conductive line over a width of the first portion of the first gate is from about 1 to about 20. In some embodiments, in which the at least one first gate via includes: multiple first gate vias, and a resistance of the conductive path increases in response to a number of the plurality of first gate vias decreasing. In some embodiments, the number of the first gate vias varies as a width of the first active area varies. In some embodiments, the integrated circuit further includes a second pair of transistors, including: a second gate of a first transistor of the second pair of transistors and a third gate of a second transistor of the second pair of transistors; in which the second gate crosses the first active area, and the third gate crosses the second active area; a third gate via disposed on the second gate; a fourth gate via disposed on the third gate; and a second conductive line electrically coupled to the third gate via and the fourth gate via.

Also disclosed is a method including the following operations: forming a gate structure shared by a first transistor of a first type and a second transistor of a second type different from the first type; forming at least one first gate via and at least one second gate via on the gate structure; and forming a conductive line coupled to the gate structure through a plurality of conductive vias, a plurality of conductive segments, the at least one first gate via, and the at least one second gate via; in which the gate structure and the conductive line extend in a first direction. In some embodiments, a ratio of a width of the conductive line to a width of the gate structure ranges from about 1 to about 20, and in which a ratio of a height of the conductive line to a height of the gate structure ranges from about 1 to about 40. In some embodiments, the method further includes forming a first active area of the first transistor and a second active area of the second transistor that are separated from each other in the first direction and extending in a second direction different from the first direction, in which the at least one first gate via aligns with a center of the first active area in the first direction. In some embodiments, numbers of the at least one first gate via and the at least one second gate via vary as a length of the gate structure varies.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A semiconductor structure, comprising:
a first gate and a second gate disposed in a first layer and aligned with each other in a first direction;
at least one first gate via disposed on the first gate and at least one second gate via disposed on the second gate, wherein the at least one first gate via and the at least one second gate via comprise a plurality of first gate vias and a plurality of second gate vias, respectively, and wherein a number of the plurality of first gate vias and a number of the plurality of second gate vias are the same;

a first conductive segment and a second conductive segment disposed in a second layer above the first layer, wherein the first conductive segment is directly connected to the at least one first gate via and at least one source/drain via; and a first conductive line disposed in a third layer above the second layer, extending in the first direction;

wherein the first and second gates are configured to be a terminal of a first logic circuit, wherein the first conductive line is electrically coupled to the first gate through a first connection via, the first conductive segment, and the at least one first gate via, and wherein the first conductive line is electrically coupled to the second gate through a second connection via, the second conductive segment, and the at least one second gate via.

2. The semiconductor structure of claim 1, wherein the first and second gates are connected to each other as a gate structure extending in the first direction.

3. The semiconductor structure of claim 2, further comprising:

a first active area and a second active area separated from each other in the first direction and extending in a second direction different from the first direction;

wherein the at least one first gate via comprises a plurality of first gate vias, and the at least one second gate via comprises a plurality of second gate vias;

wherein a number of the plurality of first gate vias are aligned along a width of the first active area in the first direction, and a number of the plurality of second gate vias are aligned along a width of the second active area in the first direction.

4. The semiconductor structure of claim 1, further comprising:

a first active area and a second active area separated from each other in the first direction and extending in a second direction different from the first direction;

wherein the first gate via aligns with a center of the first active area in the first direction, and the second gate via aligns with a center of the second active area in the first direction.

5. The semiconductor structure of claim 1, further comprising:

a third gate and a fourth gate disposed in the first layer and aligned with each other in the first direction;

a third gate via disposed on the third gate and a fourth gate via disposed on the fourth gate;

a third conductive segment coupled to the third gate and a fourth conductive segment coupled to the fourth gate, wherein the third and fourth conductive segments are disposed in the second layer; and a second conductive line disposed in the third layer and extending in the first direction;

wherein the third and fourth gates are configured to be a terminal of a second logic circuit, the first and second logic circuits coupled to each other.

6. The semiconductor structure of claim 1, wherein the first conductive segment extends in a second direction different from the first direction.

7. The semiconductor structure of claim 1, wherein the at least one first gate via is coupled to a gate terminal of a first transistor and the at least one source/drain via is coupled to a source/drain terminal of a second transistor.

8. An integrated circuit, comprising:

a first pair of transistors, comprising:

a first gate extending along a first direction; and a first active area and a second active area separated from the first active area in the first direction, wherein the first gate crosses the first active area and the second active area;

at least one first gate via and at least one second gate via that are coupled to the first gate, wherein the at least one first gate via is arranged closer to the first active area than the at least one second gate via;

a first conductive segment and a second conductive segment above the first gate, wherein the first conductive segment is directly connected to the at least one first gate via and at least one source/drain via, and wherein the at least one first gate via and the at least one second gate via comprise a plurality of first gate vias and a plurality of second gate vias, respectively, and wherein a number of the plurality of first gate vias and a number of the plurality of second gate vias are the same; and a first conductive line above the first and second conductive segments and electrically coupled to the at least one first gate via and the at least one second gate via;

wherein the first conductive line extends in the first direction, and wherein the at least one first gate via, the at least one second gate via, and the first conductive line are included in a conductive path coupled to the first gate of the first pair of transistors.

9. The integrated circuit of claim 8, wherein the at least one first gate via aligns with a center of the first active area in the first direction.

10. The integrated circuit of claim 8, wherein the at least one first gate via and the at least second gate via comprise a plurality of first gate vias and a plurality of second gate vias, respectively, and wherein a resistance of the conductive path is associated with a number of the plurality of first gate vias and a number of the plurality of second gate vias.

11. The integrated circuit of claim 8, wherein the first gate comprises:

a first portion and a second portion separated from the first portion in the first direction, wherein the at least one first gate via is disposed on the first portion of the first gate, and the at least one second gate via is disposed on the second portion of the first gate.

12. The integrated circuit of claim 11, wherein a ratio of a width of the first conductive line over a width of the first portion of the first gate is from about 1 to about 20.

13. The integrated circuit of claim 11, wherein the at least one first gate via comprises a plurality of first gate vias, and wherein a resistance of the conductive path increases in response to a number of the plurality of first gate vias decreasing.

14. The integrated circuit of claim 13, wherein the number of the plurality of first gate vias varies as a width of the first active area varies.

15. The integrated circuit of claim 8, further comprising:

a second pair of transistors, comprising:

a second gate of a first transistor of the second pair of transistors; and a third gate of a second transistor of the second pair of transistors, wherein the second gate crosses the first active area, and the third gate crosses the second active area;

a third gate via disposed on the second gate;

a fourth gate via disposed on the third gate; and a second conductive line electrically coupled to the third gate via and the fourth gate via.

16. A method, comprising:

forming a gate structure shared by a first transistor of a first type and a second transistor of a second type different from the first type;

forming at least one first gate via and at least one second gate via on the gate structure;

forming a first conductive segment and a second conductive segment extending in a second direction different from the first direction, wherein:

the first conductive segment is directly connected to the at least one gate via and at least one first source/drain via, the second conductive segment is directly connected to the at least one second gate via and at least one second source/drain via, and the first and second conductive segments are above the gate structure; and forming a conductive line above the first and second conductive segments and coupled to the gate structure through a plurality of conductive vias, a plurality of conductive segments, the at least one first gate via, and the at least one second gate via, wherein the gate structure and the conductive line extend in a first direction and do not overlap, wherein a ratio of a width of the conductive line to a width of the gate structure ranges from about 1 to about 20, and wherein a ratio of a height of the conductive line to a height of the gate structure ranges from about 1 to about 40.

17. The method of claim 16, further comprising:

forming a first active area of the first transistor and a second active area of the second transistor that are separated from each other in the first direction and extend in the second direction, wherein the at least one first gate via aligns with a center of the first active area in the first direction.

18. The method of claim 16, wherein numbers of the at least one first gate via and the at least one second gate via vary as a length of the gate structure varies.

* * * * *

UNITED STATES PATENT AND TRADEMARK OFFICE
CERTIFICATE OF CORRECTION

| | | |
|---|---|---|
| PATENT NO. | : 11,616,054 B2 | |
| APPLICATION NO. | : 16/870087 | |
| DATED | : March 28, 2023 | |
| INVENTOR(S) | : Sio et al. | |

It is certified that error appears in the above-identified patent and that said Letters Patent is hereby corrected as shown below:

In the Claims

In Column 27, Claim 3, Line 32, delete "arc" and insert -- are --, therefor.

Signed and Sealed this
Twentieth Day of June, 2023

Katherine Kelly Vidal
*Director of the United States Patent and Trademark Office*